US005771348A

United States Patent [19]

Kubatzki et al.

[11] Patent Number: 5,771,348

[45] Date of Patent: Jun. 23, 1998

[54] METHOD AND ARRANGEMENT FOR ENHANCING THE SECURITY OF CRITICAL DATA AGAINST MANIPULATION

[75] Inventors: Ralf Kubatzki; Wolfgang Thiel, both of Berlin, Germany

[73] Assignee: Francotyp-Postalia AG & Co., Birkenwerder, Germany

[21] Appl. No.: 711,091

[22] Filed: Sep. 9, 1996

[30] Foreign Application Priority Data

| | | | |
|---|---|---|---|
| Sep. 8, 1995 | [DE] | Germany | 195 34 527.4 |
| Sep. 8, 1995 | [DE] | Germany | 195 34 529.0 |

[51] Int. Cl.[6] ...... G06F 11/00

[52] U.S. Cl. ...... 395/186; 395/183.12

[58] Field of Search ...... 395/186, 187.01, 395/188.01, 182.22, 183.12; 380/3, 4, 23, 25; 364/464.15

[56] References Cited

U.S. PATENT DOCUMENTS

| | | | |
|---|---|---|---|
| 4,447,890 | 5/1984 | Duwel et al. | 364/900 |
| 4,453,210 | 6/1984 | Suzuki et al. | 364/200 |
| 4,486,853 | 12/1984 | Parsons | 364/900 |
| 4,658,352 | 4/1987 | Nagasawa et al. | 395/182.12 |
| 4,858,138 | 8/1989 | Talmadge | 364/464.02 |
| 4,885,788 | 12/1989 | Takaragi et al. | 380/23 |
| 4,907,150 | 3/1990 | Arroyo et al. | 395/182.22 |
| 4,933,849 | 6/1990 | Connell et al. | 364/400 |
| 4,933,969 | 6/1990 | Marshall et al. | 380/125 |
| 5,124,926 | 6/1992 | Barns-Slavin et al. | 364/464.03 |
| 5,283,744 | 2/1994 | Abumehdi et al. | 364/464.02 |
| 5,289,540 | 2/1994 | Jones | 380/4 |
| 5,363,447 | 11/1994 | Rager et al. | 380/21 |
| 5,379,433 | 1/1995 | Yamagishi | 395/186 |
| 5,421,006 | 5/1995 | Jablon et al. | 380/4 |
| 5,442,341 | 8/1995 | Lambropoulos | 340/825.31 |
| 5,444,631 | 8/1995 | Vermesse | 363/464.02 |
| 5,448,719 | 9/1995 | Shultz et al. | 395/182.03 |
| 5,488,702 | 1/1996 | Byers et al. | 395/186 |
| 5,490,077 | 2/1996 | Freytag | 364/464.02 |
| 5,509,117 | 4/1996 | Haug | 395/182.08 |
| 5,509,120 | 4/1996 | Merkin et al. | 395/186 |

FOREIGN PATENT DOCUMENTS

| | | | |
|---|---|---|---|
| 0 231 452 | 8/1987 | European Pat. Off. | G07B 17/02 |
| 0 457 114 | 11/1991 | European Pat. Off. | G07B 17/02 |
| OS 42 17 830 | 2/1993 | Germany | G06F 1/30 |
| OS 41 29 302 | 3/1993 | Germany | G07B 17/00 |
| OS 43 44 476 | 6/1995 | Germany | G06B 17/04 |

*Primary Examiner*—Robert W. Beausoliel, Jr.
*Assistant Examiner*—Joseph E. Palys
*Attorney, Agent, or Firm*—Hill, Steadman & Simpson

[57] ABSTRACT

In a method for enhancing the security of critical register data against manipulation, a number or a pointer that is allocated to a code word is loaded into a first non-volatile memory, and a code word is loaded into second non-volatile memories containing the critical data, whereby the code word is allocated to the last operating condition of the system, i.e. the code word has been selected on the basis of a pseudo-random sequence or as an outcome of the manufacture or a reloading of the system or before turn-off or before a voltage outage or before a standby before program interruption. A validity check of the code word is made at least at the time the system is turned on, and the old code word is replaced with a predetermined, new code word when the processor, after the validity check, recognizes the validity of the old code word with reference to the code word selected from a list with stored code words in its internal processor memory. This selection is made according to the number or the position of the pointer. The system is blocked after the time the system is turned on if the processor, after the validity check, denies the validity of the old code word with reference to the selected code word stored in the aforementioned list.

46 Claims, 8 Drawing Sheets

METHOD AND ARRANGEMENT FOR ENHANCING THE SECURITY OF CRITICAL DATA AGAINST MANIPULATION

BACKGROUND OF THE INVENTION

1. Field of the Invention

The present invention is directed to a method and arrangement for enhancing the security of critical data against manipulation in an information-processing system, particularly critical register data in electronic postage meter machines or in some other electronic means in which security-relevant data are handled, or in which an accounting of monetary data is undertaken.

2. Description of the Prior Art

Postage meter machines are equipped with at least one input means, a control module and a printer module. Data required for the operation of the postage meter machine as well as data that correspond to monetary amounts are stored in a memory in non-volatile fashion in the machine.

Postage meter machine types differ in form and configuration corresponding to the volume of mail to be processed. If, however, different types of postage meter machines are to be produced, then a plurality of circuits must be provided (ASICs or/and other components). Because of the multitude of components and circuits, different security techniques may be necessary for each type or group of types. Sometimes the added expense of such "customized" security means that a less than optimum security approach, which may be well-suited for some types but not others, may be used, which then offers points of initiation for a manipulation, particularly if no security housing is utilized.

European Application 465 236 discloses an ASIC that comprises a circuit for print control, for motor control and for accounting. The circuit for print control has a memory for constant data and another memory for variable data that are superimposed with the constant data. A motor controller is provided for actuation of a motor drive dependent on the delivery of a piece of mail. One advantage is doubtlessly the high security against manipulation due to the employment of a single ASIC, i.e., improved security already results merely from the limited number of points of access for a manipulation. One disadvantage in employing a single ASIC is the poor utility for different postage meter machines that have a different printer and control module corresponding to an existing postage meter machine system or mail processing line.

U.S. Pat. No. 4,858,138 discloses a modular system for a postage meter machine with meter/base separation, wherein a security module (meter) is coupled to a printer controller module (base). The security module can have the form of a credit card. A high-speed communication bus fashioned as a parallel CPU interface thereby serves as connecting means to the print controller module. The printer controller module is a highspeed printer. The amount of postage entered from the keyboard of the print controller module is transmitted to the security module. The security module supplies a digital display of the constant part of the postage stamp (image) and an encoded validity number. The validity number includes the amount of postage and may possibly include further information such as the serial number of the postage meter machine and the date. The encoded validity number is suitable for identifying an illegal printing of a monetary sum that was not accounted for. The security against falsification is based on an encoding of a validity number that is transmitted via a CPU interface which is undertaken in security logic. This solution, however, provides no advantage against manipulations that are undertaken in the security module itself, or at the bus between the postal value memories and the security logic. Only the security housing of the security module is provided as the sole protection. The high number of lines of the meter/base connection at the interface to the base and the need for an expensive high-speed interface is recorded are also disadvantageous.

A further possibility for manipulation is present during the data input when reloading the postage meter machine with a credit. A credit is loaded in a standard way from a data central or from a memory of a transmission means, such as a chip card. The postage amounts used by the postage meter machine are debited therefrom.

For protection against fraudulent manipulations, it is also disclosed in German 38 23 719 to print out a particular character pattern beginning with a specific date. The printing date and the character having the pattern that is authorized for this date are compared in the post office when examining the mail. An authorization means that includes a memory for storing a number of character patterns and date data serves the purpose of printing. The data that allocate the representative character pattern to a defined date are updated with an external selection means via a remote crediting when the users of the postage meter machines request recrediting. The security of the data is based on the inspection of the data in the data central before a reloading ensues and in the examination of the franking imprints on the part of the postal authority. The data central thus contributes to enhancing the security of critical register data against manipulation. This security system, however, is limited to fixed networks and cannot be applied to portable postage meter machines that are carried along from one location to another location (mobile office). A self-test for manipulation on the part of the postage meter machine is not provided.

The postage fee required for the piece of mail can be taken from a postage fee table. The postage computer that determines the valid amount of postage from the weight of the piece of mail is usually already integrated in the scale connected to the postage meter machine. Solutions with a postage computer integrated in the postage meter machine, however, have also been proposed. For example, a transportable postage meter machine disclosed by German OS 42 13 278 has a memory and a reception unit in communication therewith for data transmitted via a transmission means. The memory of the postage meter machine includes updatable sections for tables linked to specific conditions, for example for at least one current postage fee table, with reference to which the respective postage fee is determined. The postage meter machine has first means in the control that, upon activation of the postage meter machine, load at least one postage fee table for the postage meter machine from the memory of the transmission means into a predetermined memory region (portion) of the memory via the reception unit. The postage meter machine also contains second means in the control module that, on the basis of conditions input via third means, select the current postage fee table in force on the basis of the dispatching country or town and the date that have already been entered, these being selected in order to load the data. The first and second means are fashioned as hardware and/or software as a fixed-program or as a freely programmable logic module, or as a program of a microprocessor controller, and effect a connection setup to the external memory upon every activation.

Such updatable sections of the memory are likewise provided for other information and/or auxiliary information. In particular, security against fraudulent manipulations can be enhanced by loading a plurality of functions allocated to the updating date into the postage meter machine during the updating and the further triggerable functions to be loaded are multilaterally and non-selectably prescribed. For security against fraudulent manipulations, the national postal authority to which the respective dispatching location belongs can prescribe a printout that can be machine read only by the respective national postal authority. The printout, for example, can be the transaction number for an authorization check in bar code presentation or some other declared character that is printed onto the postal matter at a defined location using the same or another printer.

Such security measures are suitable for defeating the employment of a color copier for impermissible duplication of a franking imprint, however, they cannot increase the internal security of the data in the postage meter machine against manipulation.

Some of the postal authorities require a redundant storing of accounting data in memories with different technology. Each technology is affected by specific advantages and disadvantages. Some semiconductor memories do not require a battery in order to store a charge for many years, however, their storage capacity is too low. For example, $E^2$PROMs are electrically programmable non-volatile memories that have no limitations due to a limited battery service life. The disadvantage of the $E^2$PROMs is their limited number of allowed write/read cycles. When the allowed number of write/read cycles is exceeded, errors can occur in a memory area that is used.

European Application 457 114 discloses a postage meter machine with non-volatile storing of accounting data, whereby each accounting dataset contains a start section with piece number data. The current dataset can be determined via the start sections. Given an error in a memory area being used, a switch is made to another, previously unused memory area in order to store the dataset. The more unused memory areas which are available in the memory, the longer the EPROM can be used. This, however, limits the amount of data to be stored.

Battery-supported CMOS-RAMs are usually employed in postage meter machines in order to store the accounting data in the postal registers in non-volatile fashion. The accounting data can be stored arbitrarily often, limited only by the useful life of the battery. When a battery for CMOS-RAMs must be changed, the data must be copied onto another memory, for example onto another battery-supported CMOS-RAM. This copying of all data from one memory onto another memory is also called cloning. The new battery-supported CMOS-RAM or the old battery-supported CMOS-RAM with replaced or renewed battery are both fully employable when all data are identically present in their memory areas. With the housing opened, unauthorized persons could also provide an arbitrary plurality of memories with identical data contents by cloning.

To prevent the memory contents from being unauthorized reutilized in cloned fashion, however, the accounting unit would again have to be contained in a security housing. This, however, renders the replacement of malfunctioning components difficult.

Assembly units encapsulated by a security housing are described European Application 560 714. For forgery-resistant transmission of accounting data from a memory in a malfunctioning assembly unit into the memory of an assembly unit newly introduced into the postage meter machine, each assembly unit is equipped with two plug units. First, the data flow is looped through a special transmission line of a first plug unit, however, the loop is removed at the same first plug unit of the old assembly unit and the normal data flow is interrupted and rerouted. The data flow is rerouted into the new assembly unit from the memory of the old assembly unit via the latter plug unit and with a second plug unit of the new assembly unit. Mechanical interlock elements are provided that are in interactive communication with a switch that sets an electronic recognition mark (flag) that is actuated upon removal of the malfunctioning assembly unit. After the transmission of the data into the new assembly unit, a second uneraseable flag is set so that a second data transmission is rendered impossible. The security is essentially based on the encapsulation of the CPU and the non-volatile memory in the assembly unit and on the aforementioned switch for setting the flags. Given knowledge of the position or arrangement of the switch, however, penetration and manipulation with fraudulent intent cannot be prevented.

German OS 41 29 302 discloses the use of a sensor that erases the postal register when the postage meter machine housing is opened. This, however, cannot prevent a skilled manipulator from writing new data into the postal register once the housing has been opened.

European Application 231 452 discloses the periodic interrogation of sensors corresponding to a software routine of a CPU. A disadvantage of this solution is that a high calculating time is caused by the periodic sampling of the sensors. This disadvantage is aggravated when an especially time-critical interrogation is involved. In order to be able to react optimally quickly to a status change, the interrogation frequency must be selected high. The microprocessor thus spends a large part of its calculating time occupied with the interrogation. Moreover, manipulation of a machine that is turned off cannot be prevented.

The system disclosed in European Application 231 452 likewise proceeds on the basis of a redundant storing of accounting data. Since a check of the stored register values does not allow all errors to be identified, separate address and data lines were respectively utilized for two redundant memories. The occurrence of previously undetectable error conditions is thereby reduced, these potentially arising due to malfunctions of the machine or due to voltage outage. Falsifications due to an unauthorized manipulation, i.e. when the accounting data are copied in toto by cloning the postal registers from the original, however, cannot be identified with the aforementioned measures because the copy and the original are indistinguishable.

German OS 42 17 830 discloses a method for operating a data processing system with a first non-volatile memory, a status memory and a second non-volatile memory. A module identifier enables the continuation of the program and a status identifier enables the processing and continuation of the program section at which a program interruption occurred, i.e. as warranted, the correction of incorrectly entered data in a NVM on the basis of redundant data in the other NVM. This solution, however, cannot check the data content for the presence of a manipulation. When cloning memory contents, correct data are transferred into external memories. When transferring these memory contents back, or upon introduction of an external memory into the postage meter machine at a later time, a status that the postage meter machine itself does not recognize as faulty is restored, this having already been correct at an earlier point in time.

A method for improving the security of postage meter machines is disclosed in German OS 43 44 476 wherein the postage meter machine can distinguish between authorized and unauthorized intervention or, respectively, opening of its housing. The method, however, assumes that the postage meter machine is constantly supplied with energy for the self-test. In this case, no security-relevant data can be downloaded from, removed from, or supplied to the postage meter machine without permission, without this being noticed within the framework of the self-test. Nonetheless, additional housings, seals and/or further security measures are required for the protection of the deactivated machine.

The demand is often raised that the memory modules are easily replaceable for repair purposes, i.e., are neither encapsulated nor firmly soldered in, but are only plugged in. However, it then would not be possible to secure the portable postage meter machines, i.e., postage meter machines that are not permanently installed via a telephone network, against fraudulent manipulations in the deactivated condition. For security of critical register data against manipulation, improvements in the service for the machine have had to be forgone.

SUMMARY OF THE INVENTION

An object of the present invention is to provide a method for enhancing the security of critical register data against manipulation that avoids the disadvantages of the prior art and which can be economically realized for a multitude of postage meter machine versions diminishing the security against manipulation.

A further object is in an arrangement for franking postal matter, preferably a portable postage meter machine that can be operated independently of location, to assure security against fraudulent manipulations of any and all types and to assure a franking according to valid postal fee schedules dependent on the entered weight and format of the postal matter. The security circuit for postal register data and other security-relevant data that is integrated in the postage meter machine should be effected even with the postage meter machine turned off and without power supply.

The invention proceeds on the basis that a duplicating or cloning of the non-volatile memory to be protected need not be prevented, instead a duplicate of the memory content that was exchanged for the memory content of the original can continue to be employed. A copying and exchange of the memory contents is often required in case of repair, however, it is assumed that no valid frankings were undertaken in the meantime.

Inventively, an internal processor memory is employed in order to store a code word in non-volatile fashion. A separate code word is allocated to each non-volatile memory or memory area which is protected thereby, whereby at least one of these separate code words has been stored in non-volatile fashion in a further internal memory of a processor system, a chip card and/or the like and a formation of new code words is undertaken from a predetermined point in time, and a storage of the new code words in said non-volatile memories is undertaken thereafter.

The inventive solution thus does not prevent the postal register including the contents thereof from being removed in order to prepare any desired number of copies; rather, it prevents postal matter from being franked using these copies without an adequate accounting having been undertaken at the data central, or payment at the post office. An encapsulation of the components for the removable NV-RAMs that store the postal registers with a security housing, or the provision of other additional measures for protection against removal, such as gluing onto the printed circuit board, sealing or casting with epoxy resin are not required.

The security circuit for postal register data and other security-relevant data integrated in the postage meter machine is based on non-volatile memory modules. The data remains stored when the postage meter machine is turned off, or when the power supply has failed. Such CMOS-SRAMs supported with a lithium battery, for example, can be written as often as desired during their service life of approximately ten years. The battery can be neither recharged nor discharged without destroying the memory module. It is assumed that up to 150,000 imprints are possible during the service life of a postage meter machine and that the lithium battery need not be replaced during this time.

Memory means of other memory technologies can likewise be correspondingly protected against misuse by the security circuit when security-relevant data are stored in these non-volatile memories at predetermined occurrences.

The manufacturing factory of the postage meter machine stores a code word in the non-volatile memory modules (Bat-NV-CMOS-SRAMs and $E^2PROM$) that is allocated to a predetermined postage meter machine. Initially, for example, the code word can be the serial number of the postage meter machine or can be a part of some other number. Moreover, the register memory locations are pre-set with starting values by the manufacturing factory.

The inventive solution allows a determination to be made that the non-volatile memories (NV-RAMs, $E^2PROMs$) were replaced and cloned in an attempt to operate the postage meter machine later with the cloned or replaced NV-RAMs or $E^2PROMS$. The invention proceeds on the basis of an OTP processor with an internal OPT-ROM and internal OTP-RAM. A list of code words is stored in the internal OPT-ROM, each code word being active only temporarily, and possibly only once. The code word is selected from a table—stored in the internal ROM area of the OTP that is not accessible from the outside—independently of the memory contents of the NV-RAMs.

The new code word is taken from the internal OTP table at least when the postage meter machine is turned on and is stored in the non-volatile memories (NV-RAMs, $E^2PROMS$) when the old code word in the list was the respective predecessor code word.

For example, the $E^2PROM$ is the sole non-volatile memory that is glued irremovably onto the motherboard together with the OTP processor. In a preferred version, a random number is generated during operation of the postage meter machine before every imprint and thus before every piece number of franking imprints to be newly registered, the random number being generated on the basis of the preceding piece number, and possibly on the basis of the current time supplied by the clock/date module. A pseudo-random generator can be realized in terms of hardware and/or software for this purpose. At least one of the random words that can be generated is stored in the internal OPT-ROM of the OTP processor. After a comparison within the OTP processor, a redundant storage of the new code word is undertaken given coincidence, this being undertaken once into the erasable non-volatile memories (NV-RAMs) and, inventively, being also undertaken into the aforementioned, non-volatile memory ($E^2PROM$) glued non-removably onto the motherboard. The permissible number of write/read cycles for the $E^2PROM$ is not exceeded when, for example, the non-volatile memories ($E^2PROM$ and NV-RAMs) are redundantly written with a new code word every 24th franking on average.

Additionally, the non-volatile memories ($E^2PROM$ and NV-RAMs) are redundantly written with a new code word in another, last operating status of the postage meter machine that is allocated to a predetermined status, such as the status at the manufacturer or the status resulting from a reloading of the postage meter machine or turn-off, or before a voltage outage or a standby or before a program interruption etc.

The incrementation of the code words listed in the internal OPT-ROM is achieved by flags or pointers that are stored in the non-volatile memory that is non-removably integrated with the motherboard. The pointer is stored outside of the removably integrated, non-volatile memory (NV-RAM) which is to be checked, the pointer being stored in the security memory that is permanently integrated and/or that is in communication with the processor system of the postage meter machine during the running time of the postage meter machine, and which is secured against removal during the running time of the postage meter machine. In order to prevent manipulations of the aforementioned, permanently integrated security memory secured which would attempt to remove the flags or pointers with fraudulent intent, these flags or pointers should be MAC-protected.

In a preferred version, the method for enhancing the security of critical register data against manipulation includes the following steps. A pointer that is allocated to a code word is loaded into a first non-volatile memory, which is secured against removal and manipulations. A code word is loaded into second non-volatile memories that contain the postal register data, the code word being allocated to the last operating status of the postage meter machine, i.e., that has been correspondingly selected as a result of the manufacture or a reloading of the postage meter machine or the status before the turn-off or before a voltage outage or before a standby or before a program interruption. A validity check of the code word is made at least at the time the postage meter machine is turned on and additional checks will be done in correspondence to a.m. and further events. The old code word is replaced with a predetermined, new code word when the processor recognizes the validity of the old code word after a validity check with reference to the code word selected in its internal processor memory from a list with stored code words corresponding to the number or the pointer position. Alternatively, the postage meter machine is blocked after the time the postage meter machine is turned on when the processor denies the validity of the old code word after the validity check with reference to the selected code word stored in the aforementioned list.

The program for the selection of the respectively new code word is stored in the internal program memory (internal OTP-ROM or OTP-EPROM). The selection of the new code word is implemented dependent on the previous code word and/or on the status of the postage meter machine at a predetermined point in time, or given a predetermined number of items. A separate code word can be allocated to each non-volatile memory or memory area that must be protected. This can make it possible for the postage meter machine to undertake an automatic analysis as to which memory module from a plurality of memory modules was removed.

The aforementioned last operating condition of the postage meter machine corresponding to the code word particularly corresponds to a condition as a result of the manufacture or a reloading of the postage meter machine or as a result of forming a pseudo-random sequence or to a condition before the postage meter machine is turned off or to a condition before a voltage outage or before and standstill time (standby) or before a program interruption. The validity check of the code word is implemented at least at the time the postage meter machine is turned on and subsequently at least on the basis of a pseudo-random sequence.

In an arrangement for enhancing the security of critical data, particularly register data in the postage meter machine having an input unit, a display unit, a control means and memories, against manipulation, the control means includes a microprocessor or an OTP (one time programmable processor) and, in addition to a microprocessor CPU, further circuits and/or programs or data are also accommodated in the internal OTP-ROM, or in the internal OTP-RAM, in a common component housing. The data in the secured housing form a first security means against its removal and unauthorized manipulation. An external, first non-volatile memory NVM forms a second security means against its removal and unauthorized manipulation. The control unit is connected to the first and second NVM.

In one version the first non-volatile memory is realized as an internal processor memory for non-volatile storage in the processor and is thus protected against removal and manipulation.

In another version, the first non-volatile memory, as an external non-volatile memory NVM, is electrically and mechanically non-detachably connected to the processor via a printed circuit board.

In a further version, the external non-volatile memory NVM is connected to the processor via and input/output control module and is protected against removal during the running time of the postage meter machine. It is also provided that the external nonvolatile memory NVM is a component of a chip card and is connected to the input/output control module via a chip card write/read unit.

Another embodiment of an inventive method for enhancing the security of critical register data against manipulation includes the following steps. A code word is loaded into an internal first processor memory for non-volatile storage and into second, non-volatile memories that contain the postage register data, whereby the code word corresponds to the last operating status of the postage meter machine, i.e. as a result of the manufacture or a reloading of the postage meter machine or before it is turned off or before a voltage outage or before a standby or before a program interruption. A validity check of the code word is made at least at the time the postage meter machine is turned on and additional checks will be done in correspondence to a.m. and further events. The old code word is replaced with a predetermined, new code word when, after the validity check, the processor recognizes the validity of the old code word with reference to the code word stored in its non-volatile, internal processor memory. Alternatively, the postage meter machine is blocked after the point in time that the postage meter machine is turned on when, after the validity check, the processor denies the validity of the old code word with reference to the code word stored in its non-volatile, internal processor memory.

The program for the formation of the new code word is stored in the program memory (internal ROM or EPROM). The formation of the new code word is dependent on its predecessor. A separate code word can be allocated to each non-volatile memory or memory area, whereby at least one of the aforementioned code words has been inventively non-volatily stored (previously or simultaneously) in the internal processor memory.

In a step for forming a new, variable, first code word, formation of the new, second code word also ensues identically to the formation of the new, first code word in order to load an identical, new, second code word into the non-volatile memories to be protected.

Alternatively, in a further version, in a step for forming a new, variable first code word, the formation of the new, second code word ensues as a complementary shadow to the new, first code word in order to load a complementary, new, second code word into the non-volatile memories to be protected.

In another version, in a step for forming a new, variable, first code word, the formation of the new, second code word ensues as a code word identical to the variable, new, first code word and as a complementary shadow to the new, first code word in order to at least load a new, second code word into the non-volatile memories to be protected, or operation is also carried out with the complementary shadow in at least one of the memory areas given protection of a corresponding memory.

In an embodiment of the invention, the aforementioned code word modified in chronological intervals or intervals based on item counts can also be employed for the MAC protection of the postal register data. The MAC is then stored in the non-volatile memories to be protected instead of the code word. Such a method for enhancing the security of critical register data against manipulation is characterized by the steps:

Loading an authentification code ($MAC_n$) that is generated with a code word, that is allocated to the code word [and] that encodes accounting data into a first non-volatile memory that is protected against removal and manipulation during the running time of the machine;

Loading the accounting data and the aforementioned authentification code ($MAC_n$) into second non-volatile memories NVM to be protected that contain the postal register data, whereby the code word is allocated to the last operating condition of the machine;

Validity check of the authentification code ($MAC_n$) that is allocated to the code word, at least the time the machine is turned on and, subsequently, on the basis of an event;

Replacing the old code word with a predetermined, new code word for forming a further authentification code ($MAC_{n+1}$) that is allocated to the new code word [and] that encodes accounting data when the processor acknowledges the validity of the old code word or Blocking the machine after the point in time at which it is turned on when the processor, following the validity check, rejects the authentification code ($MAC_n$) checked on the basis of the old code word.

The intervals for the loading of a MESSAGE AUTHENTIFICATION CODE (MAC) after the point in time at which the postage meter machine is turned on are chronological intervals or intervals based on items counts and/or intervals determined at least on the basis of a pseudo random sequence.

DESCRIPTION OF THE PREFERRED EMBODIMENTS

Figure 1A:
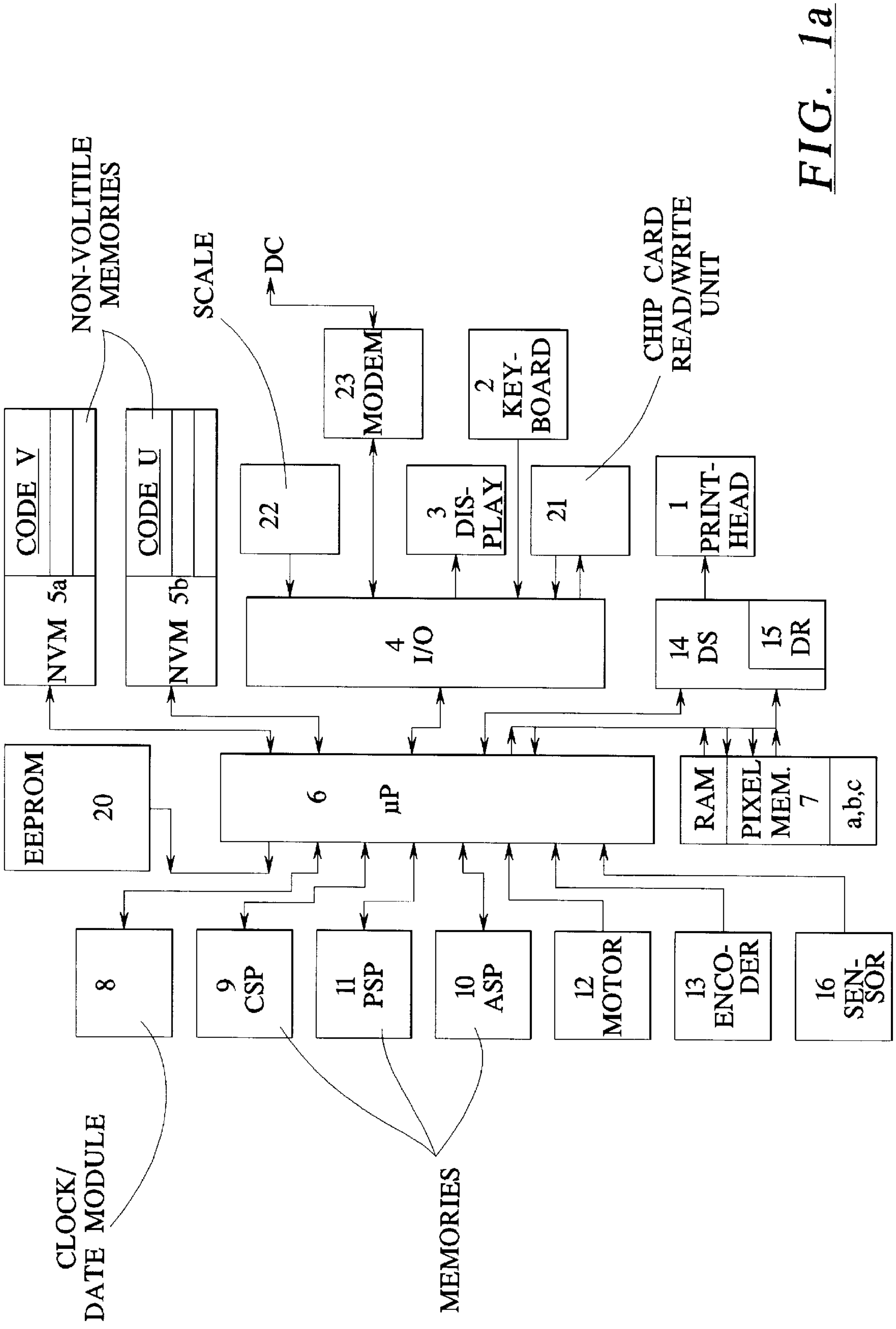
FIG. 1*a* is a block diagram of a postage meter machine with inventively enhanced security according to a first version of the invention with an $E^2$PROM.

FIG. 1*a* shows a block diagram of the inventive postage meter machine with a printer module 1 for a fully electronically generated franking format. The postage meter machine has at least one input unit 2 having a plurality of actuation elements, a display unit 3, a MODEM 23 producing communication with a data central that is coupled via an input/output control module 4 to a control unit 6, and with at least one non-volatile memory 5*a* or 5*b* for the variable parts of the franking format and at least one memory 10 or 11 for the constant parts of the franking format.

A character memory 9 supplies the necessary printing data for a volatile main memory (pixel memory) 7. The volatile main memory 7 includes, for example, an external RAM in combination with an internal RAM 6*b* arranged in the processor. The control unit 6 is a suitably fashioned microprocessor μP and is connected to the input/output control module 4, to the character memory 9, the volatile main memory 7, a non-volatile cost center memory NVM 5*a* and a non-volatile main memory NVM 5*b*. The input/output control module 4 is also connected to a user-specific program memory ASP 10 (imprint EPROM), a program memory PSP11 (program EPROM), a motor 12 of a conveyor or feeder means (possibly with strip delivery), an encoder (coding disk) 13, a letter sensor 16, as well as to a clock/date module 8. Suitable methods for controlling column-by-column printing of a postage stamp character format, suitable for use in the inventive postage meter machine, is disclosed in detail, for example, in European Application 578 042 and in European Application 576 133.

In the block diagram of a postage meter machine shown in FIG. 1*a*, the inventively enhanced security is achieved in conjunction with an $E^2$PROM 20 that is located externally from the housing of the microprocessor μP (control unit 6). Both are non-releasably secured to the motherboard.

Figure 2A:
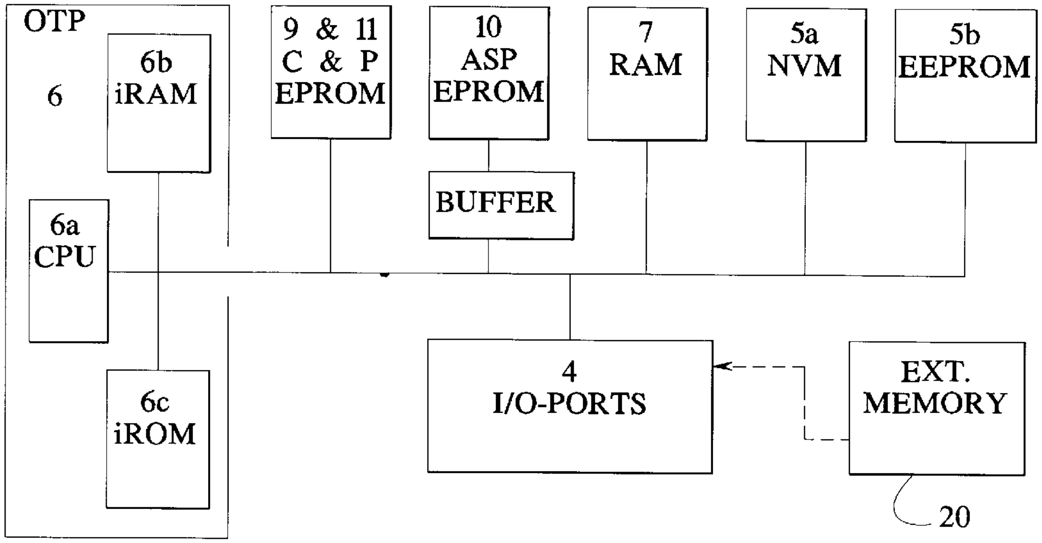
FIG. 2*a* is a block diagram of a version of the invention with an OTP processor but without an internal $E^2$PROM according to the first version.

The control unit 6—shown in greater detail in FIG. 2*a*—is a microprocessor or an OTP (one time programmable) processor. In addition to a microprocessor 6*a*, further circuits are also accommodated in the OTP processor in a common component housing. These further circuits and/or programs or data in the internal OTP-ROM 6*c* or in the internal OTP-RAM 6*b* in the common processor housing form a security circuit, i.e., first security means against unauthorized manipulation. The non-volatile memory 20 is the second security means against unauthorized manipulation.

An external non-volatile memory NVM 25 is also provided which forms a second security means against unauthorized manipulation and is connected to the processor 6 via an input/output module 4 and is protected against removal during the running time of the postage meter machine.

The other individual memories can be realized as a number of physically separate modules or can be combined in a few modules in the way shown in FIG. 2*a*. Preferably, the read-only memories 9 and 11 are combined in an EPROM and the non-volatile memories NVM 5*a* and 5*b*, which require to be protected are combined in a postal register memory. The latter is preferably redundant and is redundantly written with data in its memory areas. A method for storing security-relevant data is disclosed in greater detail, for example, in European Application 615 211.

Figure 1B:
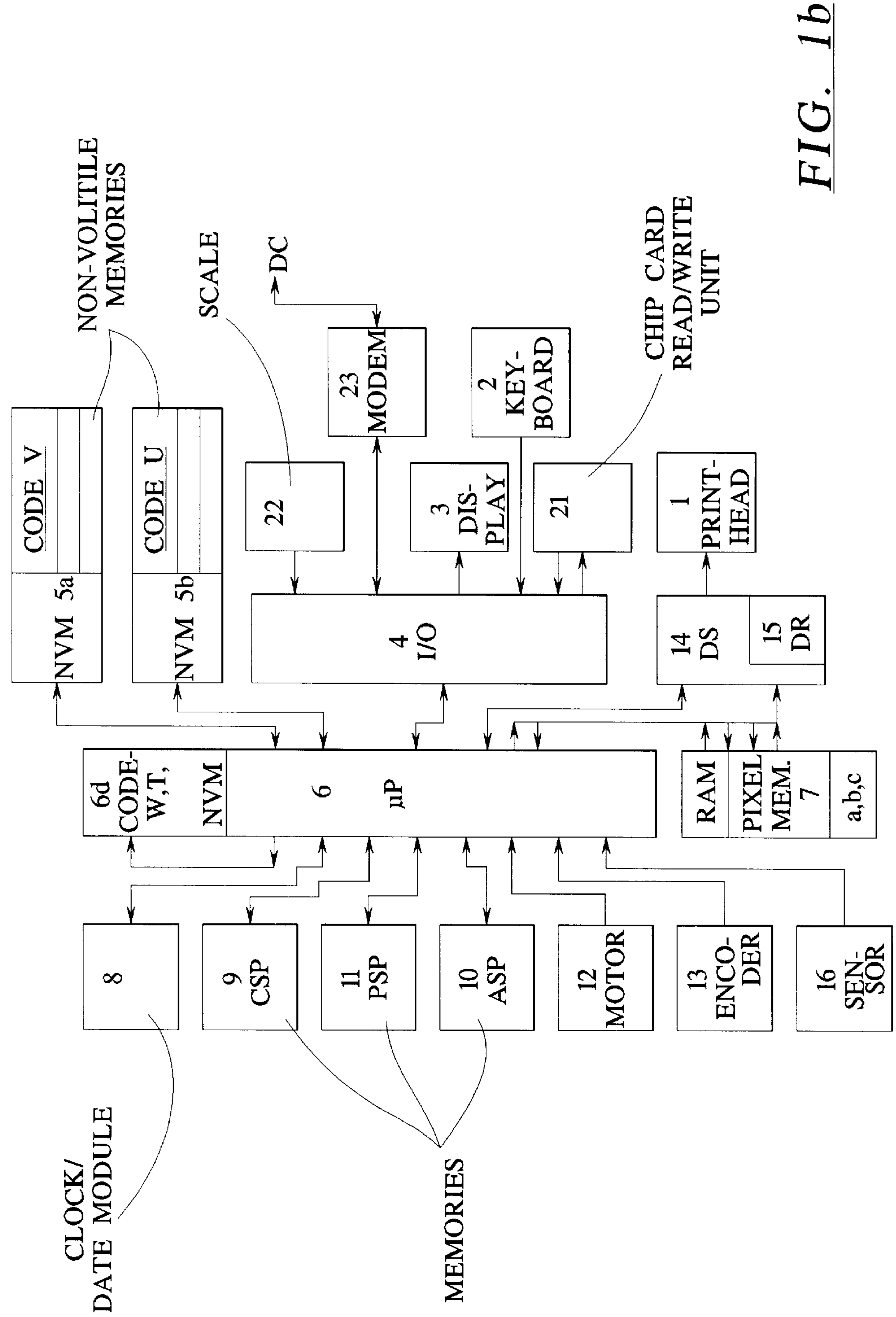
FIG. 1*b* is a block diagram of a postage meter machine with inventively enhanced security according to a second version of the invention with an OTP-internal $E^2$PROM.

The block diagram of a postage meter machine shown in FIG. 1*b* inventively achieves an enhanced security with an OTP-internal, non-volatile memory (NVM), preferably an $E^2$PROM 6*d*.

Figure 2B:
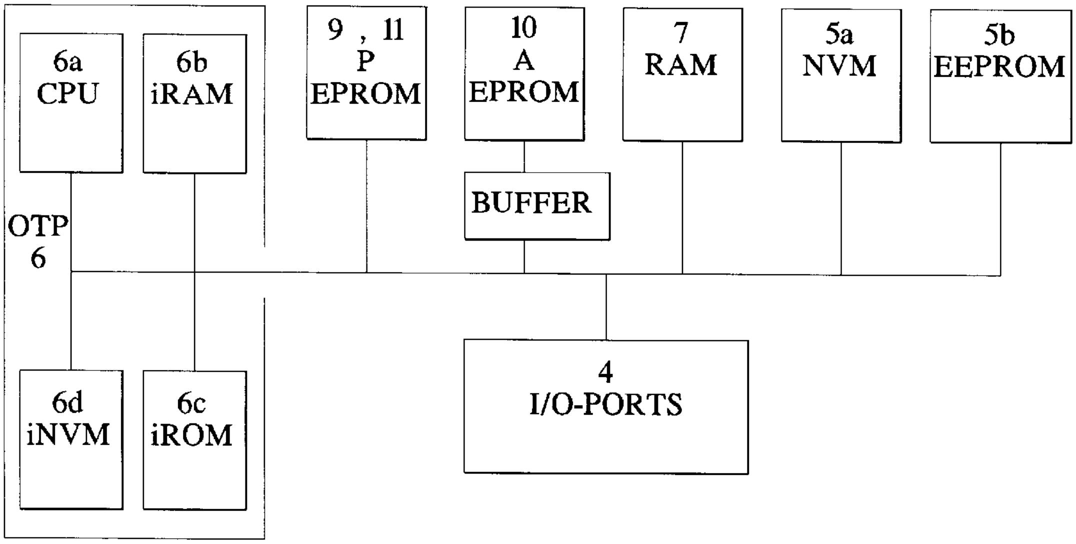
FIG. 2*b* is a block diagram of a version of the invention with an OTP processor with an internal $E^2$PROM according to the first version.

The control unit—shown in greater detail in FIG. 2*b*—includes a microprocessor or an OTP processor. In addition to a microprocessor 6*a*, internal, non-volatile memories NVM 6*d* and further circuits are also accommodated in the OTP in a common component housing. The aforementioned, internal, non-volatile memory NVM 6*d* and further circuits and/or programs or data in the internal OTP-ROM 6*c* or internal OTP-RAM 6*b* in the common processor housing again form a security circuit, i.e., a security means against unauthorized manipulation.

An internal, non-volatile memory NVM 6*d* in the security means of the OTP processor 6 collaborates with the program memory 6*c* (internal EPROM or ROM) and volatile data memory RAM 6*b*. As a result of the possibility of setting security bits (given the internal EPROM), or of undertaking a mask programming (in the internal ROM) during manufacture, read-out of the internal, non-volatile memory from the outside can be prevented.

In the solution according to the first version—shown in FIG. 1*a*—with the non-volatile memory NVM 20 located externally of the OTP processor 6, the NVM 20 forms second security means against unauthorized manipulation. The external, non-volatile memory NVM 20 in the preferred version—as shown in FIG. 1*a*—is a component of the processor system of the postage meter machine and collaborates with the program memory 6*c* (internal EPROM or ROM) and volatile data memory RAM 6*b*.

In the aforementioned block diagram of the inventive postage meter machine, a chip card write/read unit 21 is also shown. This is in communication with the processor 6 directly via a bus 11 or via the input/output control module 4. A connection of a modem 23—not shown in greater detail in FIG. 1*a*—is also provided directly via the bus 11 or via the aforementioned input/output module 4. The chip card that must be plugged into the chip card write/read unit 21 include an external, non-volatile memory 25.

As already mentioned, the read-out of the internal program memory from the outside can be prevented by the possibility of setting security bits (in the internal EPROM) or by undertaking a mask programming (in the internal ROM) during manufacture. The security bits are set in the OTP processor by programming the internal EPROM during the manufacture of the postage meter machine. Observing such security-relevant routines such as, for example, debiting routines, with an emulator/debugger would likewise lead to a modified time sequence, which would be identified by the OTP. This also includes a clock generator/counter circuit for prescribing time intervals or clock cycles, for example for the time-out generation or printer control. Advantageously, the clock generator/counter circuit is utilized for program running time monitoring as disclosed in greater detail in European Application 660 269. When a specific time has elapsed and an anticipated event has not occurred, the clock generator/counter circuit generates an interrupt that reports the expiration of the timespan to the microprocessor, whereupon the microprocessor initiates further measures. The monitoring function is assumed in the aforementioned way by the aforementioned, first security means that is a component of the processor (OTP), and that is in interactive communication with corresponding software during operation of the postage meter machine. In an advantageous, further version of the time monitoring, a code word in the external NVM 5*a*, 5*b* or in the EEPROM 25 is erased. This can ensue by overwriting with a predetermined, other word, for example 0000. A particular advantage of this approach is that the security circuit reacts during operation to a manipulation due to unauthorized intervention into the postage meter machine.

In the second version—shown in FIGS. 1*b* and 2*b*—, the monitoring function is now also assumed in the aforementioned way by the security circuit formed by the processor 6*a* and memory 6*d*, this security circuit being a component of the processor (OTP) and taking effect in conjunction with suitable software during the operation of the postage meter machine. For example, a CMOS 1-chip 8-bit microcontroller Philips 80C851 or 83C851 with a non-volatile 256×8-bit $E^2$PROM as the internal processor memory can be utilized as the processor 6*a*. The code word can be non-volatily stored in the aforementioned, internal processor memory more than 50,000 times. The data preservation is likewise guaranteed for ten years. Another suitable processor, for example, is the TMS 370 C010 of Texas Instruments that likewise has an internal 256 byte $E^2$PROM.

The security circuit for postal register data and other security-relevant data integrated in the postage meter machine protects the data content of non-volatile memories, for example the content of CMOS-SRAMs supported with a lithium battery, from use in an unauthorized, cloned copy without debiting.

CMOS-SRAMs supported with a lithium battery have a service life of at least ten years. A memory area of 256K given type DS1230Y/AB of Dallas Semiconductor or a memory area of 1024K for an NV-SRAM given type DS1245Y/AB are available, for example, as non-volatile memory modules.

The clock/date module 8 can likewise be protected according to the same method. This clock/date module 8 is a non-volatile timer RAM and likewise contains a lithium battery having a life of at least ten years. The module DS 1642 of Dallas Semiconductor includes a 2K×8 NV/SRAM.

Memory units employing other memory technologies can additionally be utilized corresponding to their service life. The security circuit, for example, only stores data in these non-volatile memories at the point in time of turn-on or upon re-initialization of the postage meter machine after it has been in a standby mode, i.e. at times when no accounting requirement is present and when no franking ensues. Normal $E^2$PROM memories, particularly type 28256, require no internal battery and allow at least 10,000–100,000 write/read cycles. The security circuit for postal register data and other security-relevant data integrated into the postage meter machine correspondingly control the aforementioned, non-volatile memory modules such that the service life is lengthened or adequate.

When, in addition to a code word, the data content of the postal register are also stored encoded as a checksum in the non-volatile memories 5*a* and 5*b*, manipulation of the postal registers can be effectively prevented from the outset. For example, an OTP processor is utilized, having a stored algorithm in the internal ROM for such a checksum method.

Set flags prevent a readout of the security-relevant data from the processor. A known checksum method is based on a MAC (message authentification code) that is appended to the data to be protected. Such a MAC protection is advantageously placed over the postal register data. In a development of the invention, the aforementioned code word that is modified in chronological intervals or in intervals based on item counts can also be employed for the MAC protection of the postal register data. In the control case, however, a code word that is modified at time intervals suffices in order to guarantee security.

The monitoring function in the first version—shown in FIGS. 1*a* and 2*a*—is also realized in the processor 6*a*. This, for example, can be an 8051 processor with a 16K byte on-chip EPROM as the internal program memory. The internal OTP-RAM has a memory area of 256 bytes.

It is then inventively provided that the non-volatile memories containing the postal register data, particularly battery supported CMOS-RAMs (Bat-NV-CMOS-RAMs), contain a code word that was selected corresponding to the last operating condition of the postage meter machine before turn-off or before a voltage outage or before a entry into the standby mode or before program interruption, and the old code word is replaced by a predetermined, new code word at least at the time the postage meter machine is turned on.

Inventively, thus, the code word is automatically modified in all non-volatile memories that handle security-relevant data, this modification taking place upon predetermined events in the operational postage meter machine. Such a measure prevents a cloned memory content of a non-volatile memory (Bat-NV-CMOS-RAMs) from being employed more than once because the code word in the non-volatile, internal processor memory and in the postal register (Bat-NV-CMOS-RAMs) is modified as soon as a predetermined operating condition of the postage meter machine is achieved after the machine in turned on or after the return of the voltage following an outage, or after departing the communication mode or upon the reloading of the postage meter machine with a credit or after a standby or after some other program interruption.

A duplication or cloning of a Bat-NV-CMOS-RAM or cloning of other NVRAMs is not prevented by the aforementioned measure. A duplicate of the memory content that replaced the memory content of the original can also continue to be employed. In this case, the code word of the original becomes invalid at a later time, i.e. a re-exchange of the memory contents would be noticed by the processor on the basis of the code word in the non-volatile, internal processor memory that was likewise modified in the meantime.

Moreover, modification of the code words with an unaltered data content of the memory can not be undertaken by the manipulator without knowledge of the key and knowledge of the parameter data, even if the algorithm for the formation of the new code word were known. A known encoding method such as, for example, DES can therefore be utilized.

Figure 7:
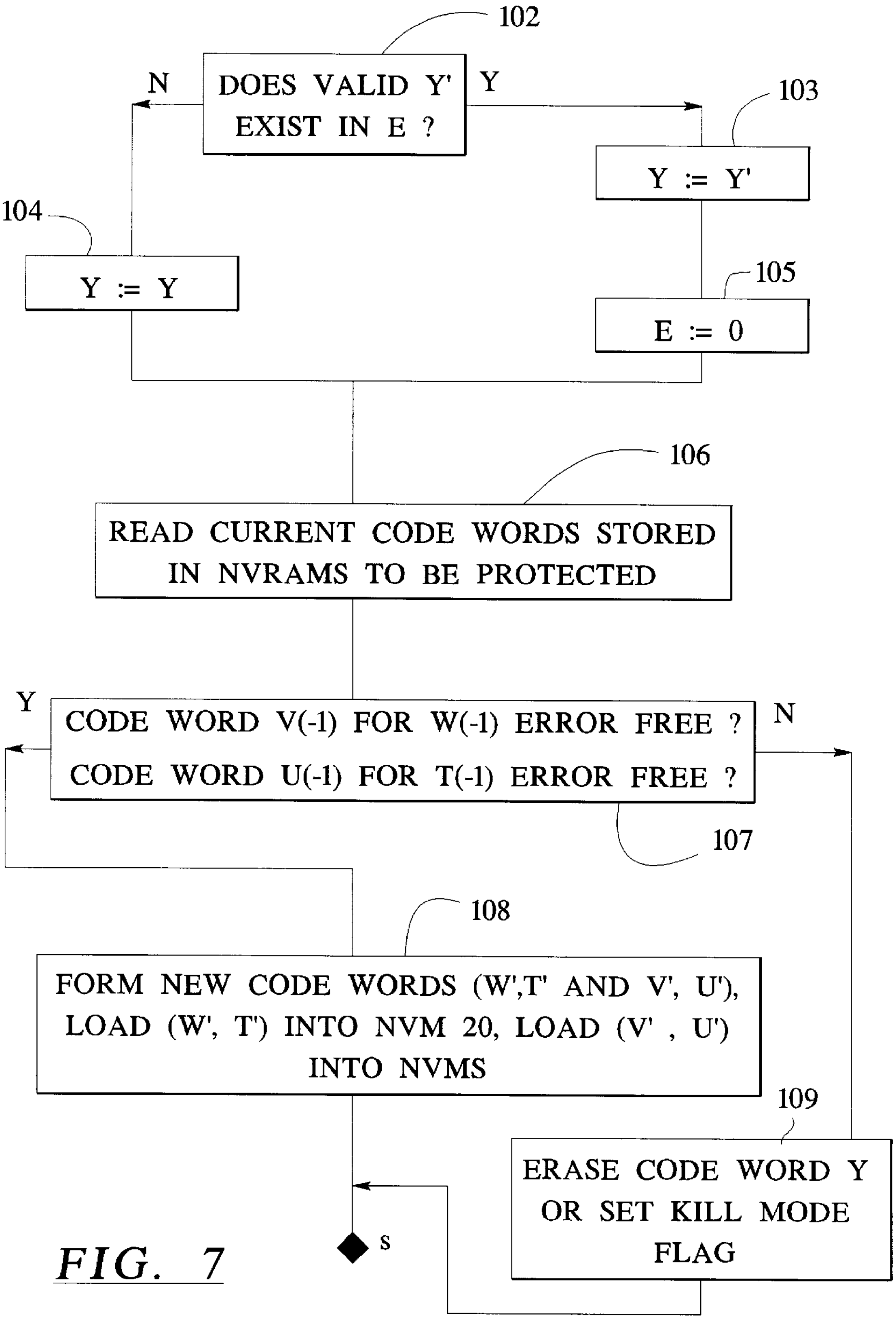
FIG. 7 is a flowchart for the inventive method for enhancing the security of the postage meter machine against manipulation.

The inventive method for enhancing the security of critical register data against manipulation includes further security steps that are shown in FIG. 7.

In step 106, the code words stored in the non-volatile memories to be protected are successively read and then transmitted to the processor. The processor implements a security step 107 for checking the previously valid code word and a step 108 for the corresponding modification of the code word when the check yielded the coincidence or freedom from error. Otherwise, a branch is made from step 107 to step 109 in order to set a number identifying the kill mode, or to set at least one MAC secured kill mode flag in the constantly interrogated, non-volatile, external security memory.

Figure 8A:
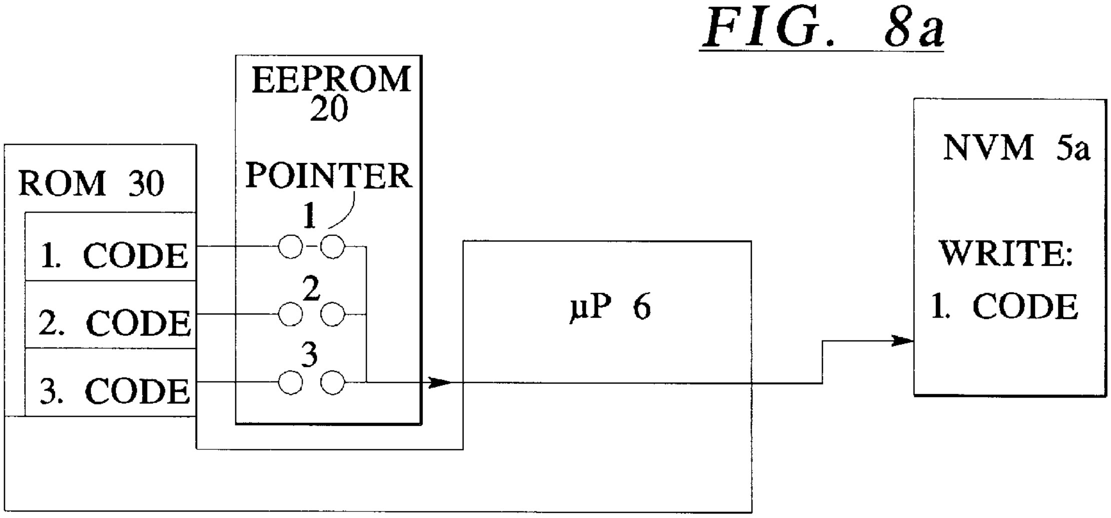
FIGS. 8*a–c* respectively illustrate pointer positions according to the inventive method of the first version.
Figure 8B:
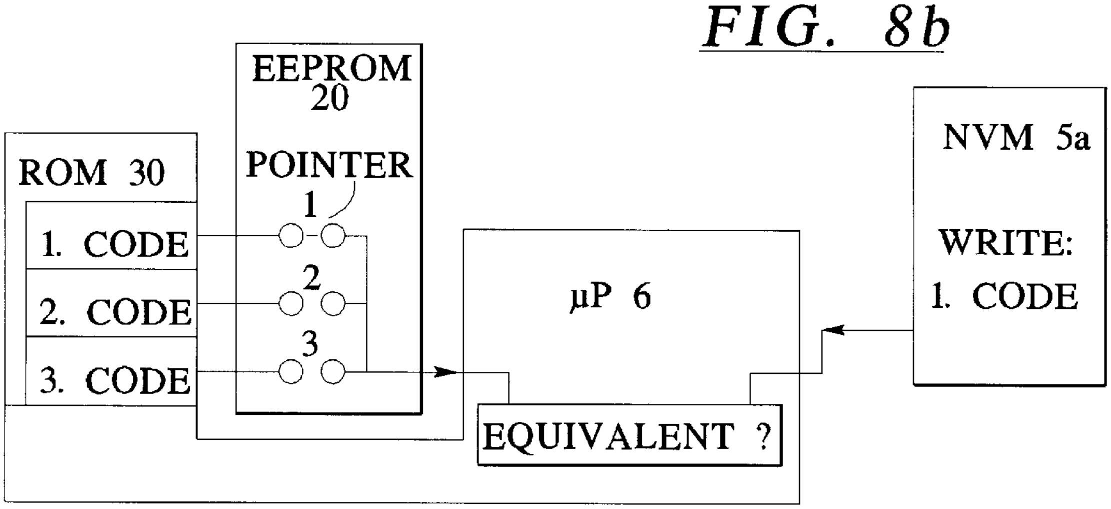
Figure 8C:
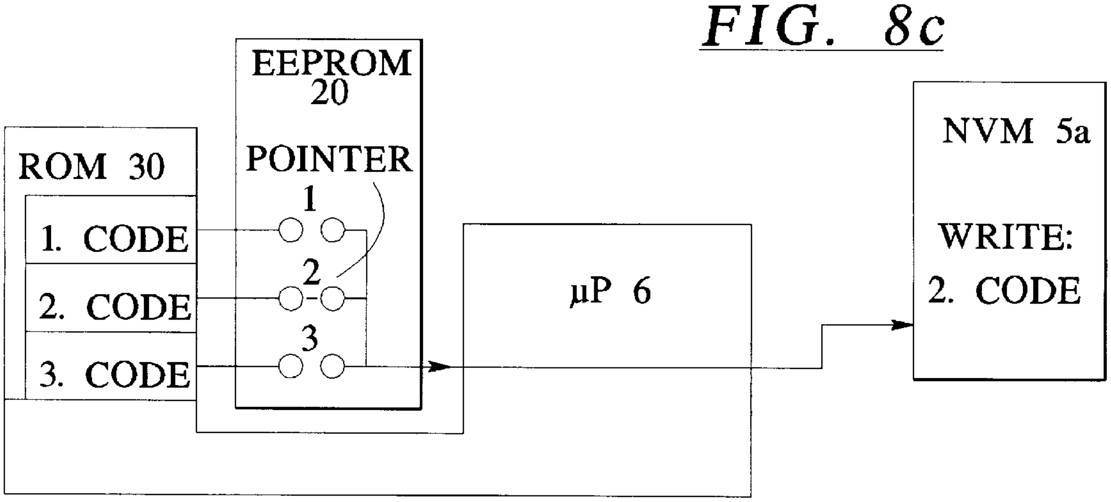

FIGS. 8*a–c* show pointer positions according to the inventive method. FIG. 8*a* shows an initial status pre-setting. Such a pre-setting is required in step 107 (FIG. 7) in order to identify the correct, old code word from the stored list. Upon first initialization of the machine at the manufacturing factory, the pointer stands at a number 1. Alternatively, the serial number of the postage meter machine can also form an initial number. The pointer position (number 1 or some other initial number) is stored. Then a first code that stands in first place in the list is stored in the NVM 5*a* or 5*b* to be protected. The postage meter machine leaves the factory set to the number 1 or the initial number. The postage meter machine is then turned on or at the dealership or by the customer (FIG. 8*b*). The first code is read from the list corresponding to the pointer position and is compared to the first code stored in the NVM 5*a* or 5*b* to be protected. This first phase corresponds to step 107 of FIG. 7 in which a determination is made as to whether a memory was removed in the meantime without final accounting and had been replaced by another and was now utilized again with the old data content. If the codes are the same, the pointer position is advanced according to FIG. 8*c* to a second code word in the list, this being derivable from step 108 in FIG. 7. The pointer position is modified in a predetermined way. In the simplest case, the pointer position is incremented or deincremented. The first code in the NVM 5*a* or 5*b* to be protected is now replaced by the second code, i.e. is overwritten. When, after being turned off, the postage meter machine is again turned on, a check is undertaken on the basis of the current code analogous to the way shown in FIG. 8*b* and FIG. 7, step 101.

In the preferred exemplary embodiment, separate code words W(−1) and T(−1) are respectively provided for each physical memory module is employed for two non-volatile memories NVM 6*d* and NVM 5*a* in step 107 for checking the previously valid code word V(−1), U(−1).

After checking the old code word in step 107 and before the corresponding modification of code words D and U, a new code word WV and, subsequently, a code word T' are formed in step 108 for two non-volatile memories NVM 20 and NVM 5*a*, being formed according to the equations:

$$W':=F\{P1\} \text{ and } \quad (1)$$

$$T':=F\{P2\}, \quad (2)$$

whereby P1 and P2 are listed code words.

In one version, a new code word is generated with the listed code words and with internal data according to an internal program, this being generated with a mathematical function F that makes the external simulation of code words significantly more difficult, so that a manipulation with fraudulent intent is rendered practically impossible.

In the simplest case, a numerical value is incremented in the internal NVM 20 before a new code word (W', T', U', V') is formed. For example, a cryptographic function that is present stored in the internal OTP-ROM as an algorithm or a program can be employed as the mathematical function F. For example, the DES algorithm (data encryption standard) or a random function can be utilized in order to determine the new pointer corresponding to F.

The aforementioned formation of code words includes the calculation and/or the selection from a list of code words that is present stored in the internal OTP-ROM. In the ideal case, each code word should be employed only a single time for securing the external, non-volatile write/read memories. This, however, requires a number of code words to be stored in the OTP-ROM.

Only the pointer position or the number that indicates the position of the respective code word in the list stored in the OTP-ROM need be stored especially secured externally of the OTP processor and externally of the non-volatile write/read memories NVM 5*a* and 5*b* to be protected. This securing of the second security means such as the EEPROM 20 against removal from the processor system can be assured by a gluing or by a protected encapsulation of the aforementioned security memory together with the processor.

In the inventive versions with storage in the chip card, a gluing or a protected encapsulation of at least one of the external, non-volatile write/read memories can be forgone.

These versions are based on the condition that the memory of the chip card cannot be manipulated or cloned. A manipulator cannot be able to interrogate the code word to be newly formed before activation in order to equip his cloned memory with it. The pointer position or number can be encoded with DES when this is transferred to the chip card. Alternatively, the code word is communicated, or only the instruction for the restoration thereof or critical parts of the instruction. The communication again ensues encoded or MAC protected. Such a method has the advantage that the aforementioned special processor is not needed and all postal register NVRAMs still are able to be unrestrictively plugged to the motherboard and thus can be mounted in easily replaceable fashion.

Alternatively, it is also possible for a code word stored in the list to be read out encoded if a special processor is present. The code words from the memory to be protected and the code word from the aforementioned list, identified by the pointer, are communicated encoded to the chip card, whereby the chip card undertakes the comparison for the purpose of the security check.

In a further version, the code word is transmitted from the postage meter machine to the memory of a remote similar processor system. Every time the postage meter machine is turned on, a connection to the data central is set up. Freedom from error is determined by comparing the code word externally stored in said remote similar system to the code word stored in the postal register NVRAM in order then to form a new code word and store it in the NVRAM of said remote similar processor system and in the postal register NVRAM. The comparison can be carried out in the processor system of the postage meter machine. An alternative is to store the code word in a nearer specific transmission means (for example, a chip card). A communication connection to the remote processor system would then not be a prerequisite for the initialization of the postage meter machine if the chip card was plugged in at the outset. A corresponding communication mode 300 is provided after turn-on during the running time of the postage meter machine.

Given the second version shown in FIGS. 1*b* and 2*b*, the code words stored in the non-volatile memories to be protected are successively read and then transmitted to the processor. The processor implements a security step 107 for checking the previously valid code word and a step 108 for the corresponding modification of the code word when the check yielded coincidence or freedom from error. Otherwise, a branch is made from step 107 to step 109 in order to erase a code word Y or in order to set at least one kill mode in the internal non-volatile memory 6*d* of the processor.

For two non-volatile memories NVM 6*d* and NVM 5*a*, a new code word W' and, subsequently, a code word T' for the second processor-internal NVM 6*d* is formed in step 108 after checking the old code word in step 107 and before the corresponding modification of code words V and U, these being formed according to the equations:

$$W' := F\{P1\} \text{ and} \tag{1}$$

$$T' := F\{P2\}, \tag{2}$$

whereby P1 and P2 are different, continuously changing variable parameters, for example the current time, number of program interruptions, or other program, time or physical parameters, or a listed code. In one version, a new code word is again generated with internal data according to an internal program, by means of a mathematical function F that renders the external simulation of code words significantly more difficult, so that a manipulation with fraudulent intent is rendered practically impossible.

In the inventive, second version, the involvement of postal register values as check identifier and a gluing or a protected encapsulation of at least one of the external, non-volatile write/read memories can be forgone. Only later, for example in the franking mode 400 (FIG. 5), is the data content checked in the accounting to determine whether the register value sum R3 is equal to the sum from the ascending register R1 (remaining credit) and descending register R2 and/or whether the postal register values are valid (for example, on the basis of authenticity checks, plausibility checks and similar checks).

Figure 3:
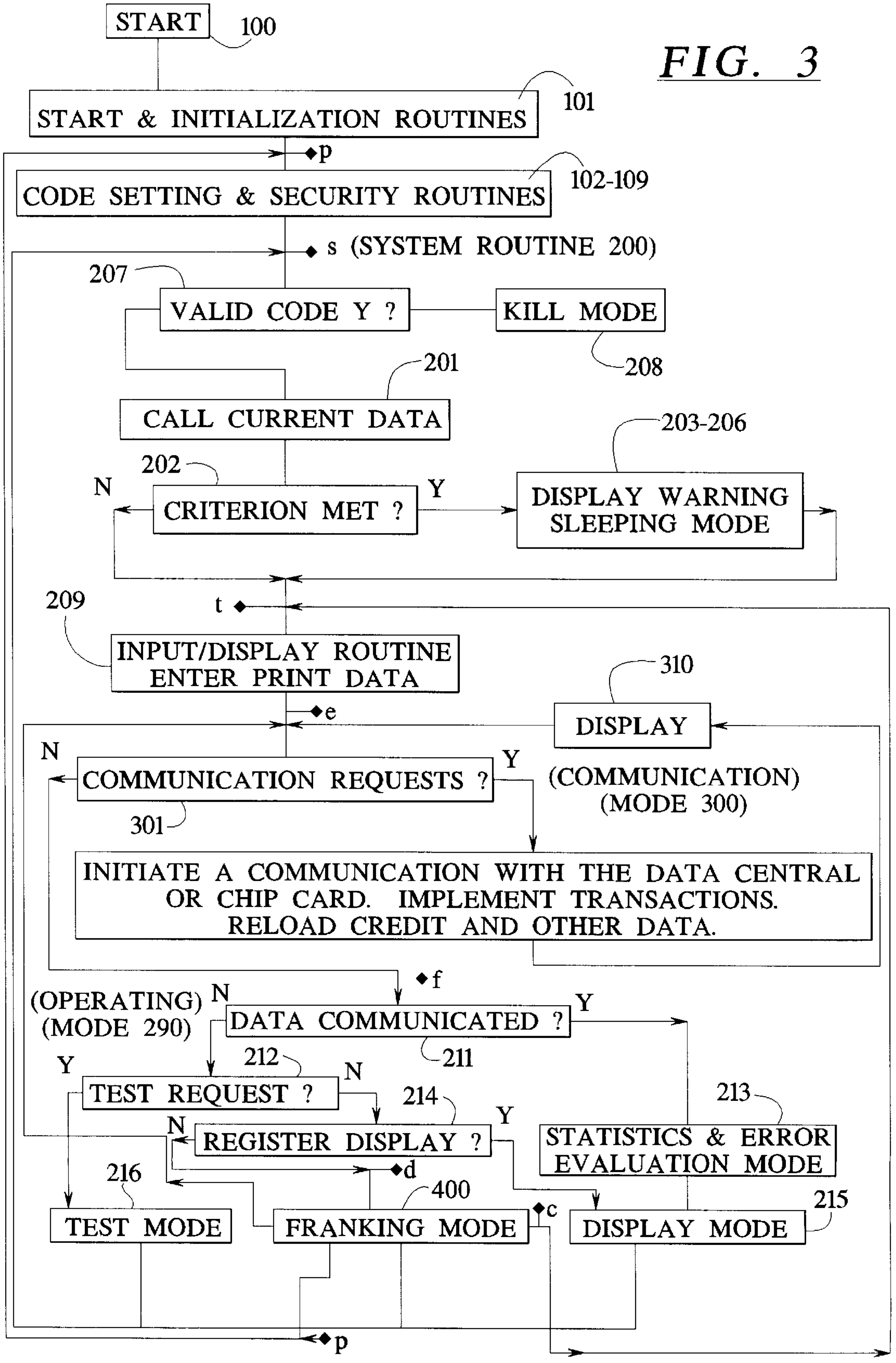
FIG. 3 is an overall flowchart for the inventive postage meter machine.

The inventive method is incorporated into an overall executive plan of the postage meter machine shown in FIG. 3. After the start 100, measures for security checking and for restoring defined initial condition ensue in a step 101 covering the start routine and initialization.

The further steps 102–105 ensue as warranted for restoring the operational readiness, for example after a repair of the postage meter machine and are shown in greater detail in FIG. 7.

In steps 106–109, the read, old code words are checked and exchanged for new code words. Subsequently, the new code word is also transmitted into the NV-RAMs NVM 5*a* and NVM 5*b* and forms a corresponding code word (V', U') therein. The step 108 also includes the checking the proper storage of the code words (U', V' or W', T'). When an implausible deviation is found in the check of the previously valid code word, a branch is made to a step 109 that includes measures that ultimately prevent further frankings with the postage meter machine. For example, a third code word Y predetermined by a data central can be erased, the absence thereof documenting the manipulation. Subsequently, a branch is made to the system routine (point s).

The overall executive plan for the postage meter machine shown in FIG. 3 includes steps 201–206 and 207–208 for monitoring further criteria. Given an infringement of, for example, a security criterion checked in step 207, the postage meter machine enters into a corresponding kill mode (step 208). As a result of a security criterion checked in step 202, the postage meter machine enters into a sleeping (warning) mode (203–206) when a connection to the data central has not yet been set up after a predetermined number of items has been used.

The postage meter machine and the data central respectively negotiate a predetermined number of items S, i.e. the amount that can be franked before the next call setup. If a communication does not occur (monitoring the number of items), the postage meter machine slows down its operations (sleeping mode version 1) so that work can continue to be carried out up to a next item number limit without display of a warning. It is possible, however, to emit a repeated warning at decreasingly shorter intervals, i.e., after a predetermined number of frankings, these warnings more and more urgently indicating the requirement of a communication with the data central (sleeping mode version 2). Finally, it is possible (sleeping mode version 3), to emit a constant warning for an impending dormancy of the franking function in step 203. This constant warning, due to the satisfied interrogation criterion in step 202, must always be transversed before step 205 is reached. The step 203 includes a sub-step for error statistics corresponding to the statistics and error evaluation mode 213. This version is executed without the aforementioned step 204. Franking is not negatively influenced by the sleeping mode. As long as the check in step 205 shows that the piece number S is still greater than 0, step 207 is reached. The warning merely appears more and more frequently in the display. Otherwise, a branch is made to step 206, whereby, for example, a flag is set that is interrogated later in step 301 and is interpreted as a communication request. An additional display can likewise ensue in step 206 to the effect that the communication now ensues automatically and the franking function is inoperative until the communication has been successfully terminated. Of course, the postage meter machine user can call the communication mode 300 at any time, i.e., before any warnings appear or during such warnings. In the step 207 preceding the communication mode 300, further criteria relevant to the security against manipulation are checked. If a manipulation of the machine that was undertaken with fraudulent intent is found, a branch is made to step 208 in order to prevent franking with the manipulated machine. In such a case, the machine would enter into the kill mode. Franking is not prevented when the postage meter machine is only in the sleeping mode.

After the checking of the criteria for the kill mode (steps 207–208) and for the sleeping mode (steps 202–206), a point t shown in FIG. 3 is reached. In step 209, inputs can be actuated before the point e is reached.

After entry into the communication mode 300, the user has the possibility of producing communication with the data central, or a communication may automatically be produced with the data central—according to the overall executive plan shown in FIG. 3.

If the communication was successful, an inquiry is made in step 211 to determine whether data were communicated. The step 213 is subsequently reached. In step 213, the current data are identified or loaded, this data being called in step 201 and being again subsequently required in the comparison in step 202. The communicated decision criterion is preferably the new piece number S'.

The evaluation mode in step 213 inventively also includes the formation of new code words U', V' for the non-volatile memories to be protected as an outcome of a reloading event that was undertaken in the communication connection to a data central. The steps 106–109 shown as an example in FIG. 7 for code word Y proceed in sequence analogous for forming the code words U', V'.

If an intervention authorization for the postage meter machine was previously requested at the data central, a new, third code word Y' predetermined by the data central is loaded, this possibly replacing the old, third code word Y. An opening of the postage meter machine and a replacement of malfunctioning components is often unavoidable for repair purposes. Preceding measures for obtaining intervention authorization are therefore required, these measures allowing operation of the postage meter machine after it has been repaired. An unauthorized opening of the postage meter machine is thereby precluded. When the postage meter machine is to be placed back into operation after the intervention, the new, third code word Y' prescribed by a data central can, due to the intervention authorization for the postage meter machine, replace the old, third code word Y as described, for example, in German OS 43 44 476.

If, thus, the old third code word Y prescribed by a data central were erased because the memories were completely replaced and their variable code word (V, U) is not present or does not agree with the internally stored code word, the postage meter machine would be able to continue to operate. Continued operation of the postage meter machine is possible because a new third code word Y' is employed, whereby—as shown in FIG. 7—*a* branch is made to step 108 in order to form a new, variable code word (T', W') and to load it into the NV-RAMs as code word (V', U').

Figure 5:
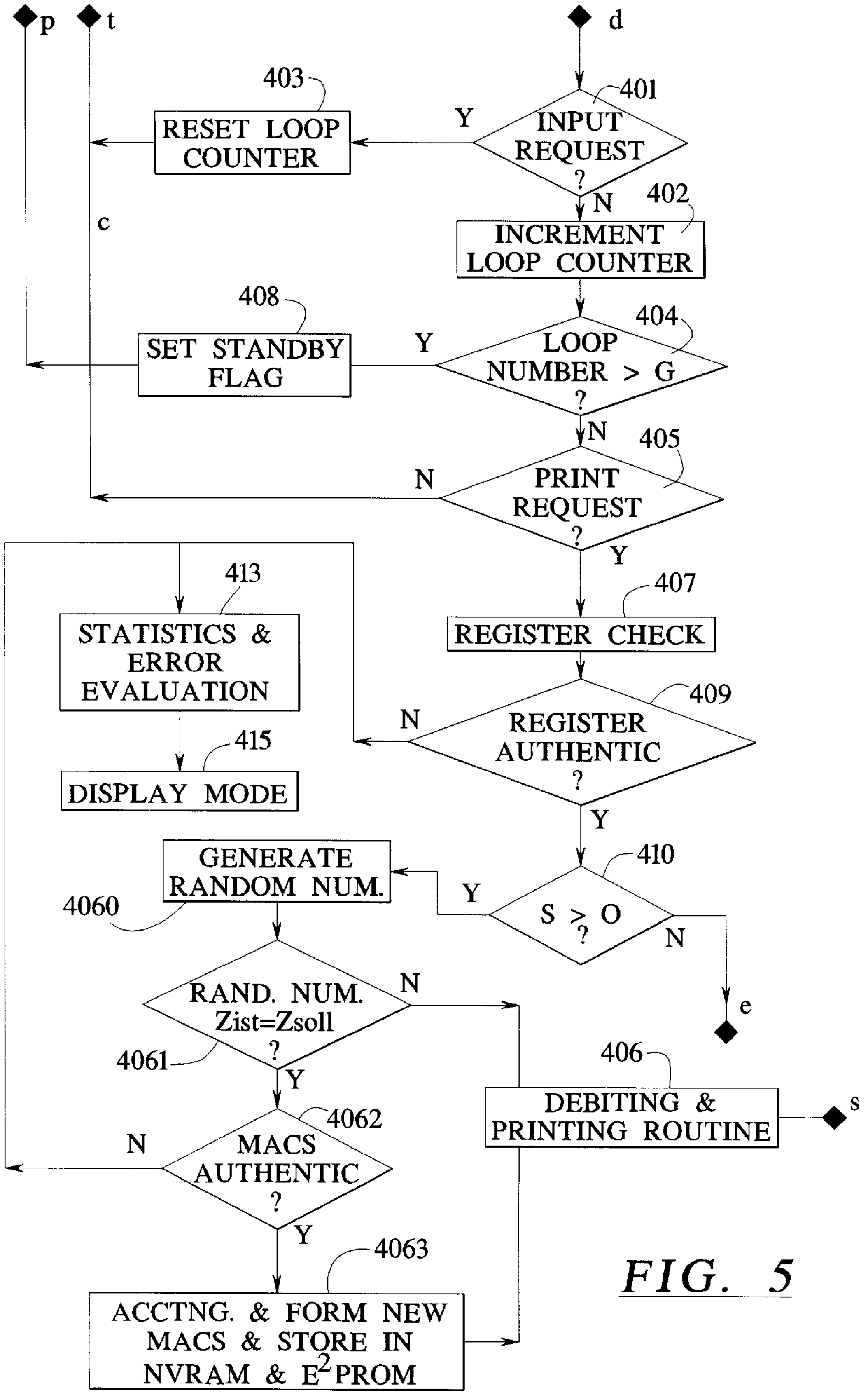
FIG. 5 is a flowchart for the franking mode of the inventive postage meter machine.

In a modified flowchart version—compared to the flowchart shown in FIG. 7—, operations in at least one of the memory areas or NVRAMs can also be carried out with the complementary shadow (V", U") instead of with a code word (V, U) identical to the variable code word (W, T). The form of checking the previously valid code words and their replacement by new code words in one of the memory areas of the non-volatile memory NVM 5*a*, 5*b* vary according to steps 102–105 which are shown in FIGS. 3 and 5. After a verification of the new code words V', U' and/or Y' that may be stored in a memory area E of the NVM 5*a*, 5*b*, the old code words are erased and the new code words are correspondingly addressed so as to be fetchable. This can ensue analogous to the execution as shown in FIG. 7 in German OS 43 44 476 by setting the new code words V', U' and/or Y' to the address of the old code words V, U and/or Y.

Figure 4:
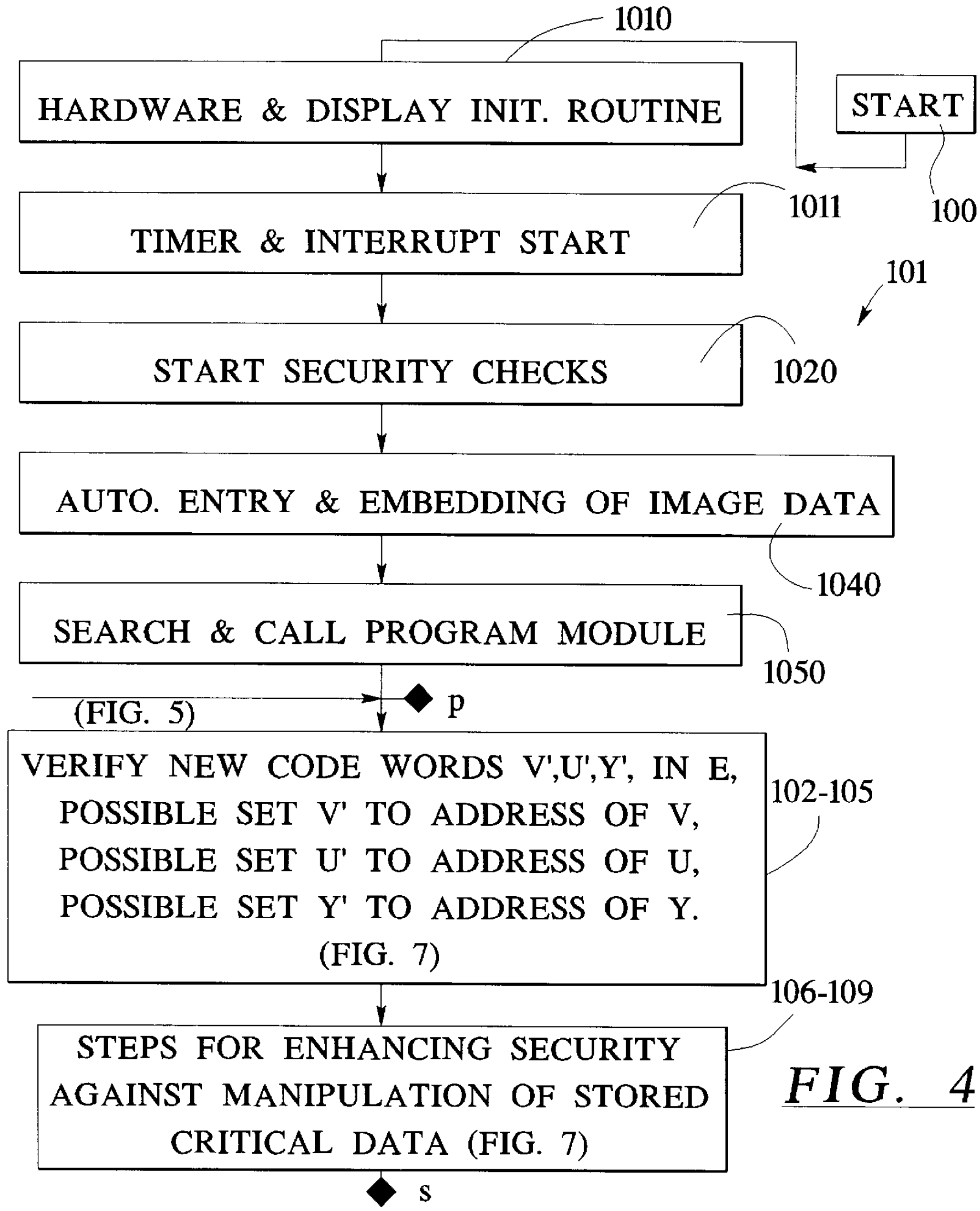
FIG. 4 shows details of the flowchart of FIG. 3.

After a preceding event or a program interruption (standby), a point p is reached and according to the details of the executive plan shown in FIG. 4, a first security step 107 of the flowchart of the inventive method shown in FIG. 7 is reached via steps 102–105.

Only upon a commissioning (bringing a machine on-line) or after a voltage outage, is the current program module PM first called according to the module identifier in a step 1050 preceding the aforementioned point p after an initialization, the sections thereof to be subsequently further-precessed. The step 101 shown in FIG. 3 comprises a number of sub-steps that are explained in greater detail below with reference to FIG. 4.

First, standard hardware and display initialization routines are executed in step 1010 before a step 1011 for the timer and interrupt start is reached. The internal program then begins with the start-up security checks. Advantageously, a check can already be carried out in step 1020 to determine whether a code word or memory contents is valid. Subsequently, given validity, a step 1040 for automatic entry of stored data with print data editing and embedding of the image data is reached.

After the marker or pointer is called in step 1051, a test is carried out in a further step 1052 to determine whether the program module must be further processed. If this is not the case, the next program module PM (+1) is called in step 1054. Otherwise, a check is made in a step 1053 to determine whether program sections of a preceding program module PM (−1) must be processed to their end, and a branch is made to a step 1056 or to a step 1055 if a program section of the current program module PM must be processed further. After a determination of the current program module according to steps 1054, 1055 or 1056, a branch is made to the point p.

For processing critical and uncritical program sections within this program module, markers, for example a phase identifier, are set, as is known from German OS 42 17 830, or pointers are set, thereby enabling a reconstruction of defined statuses for the further program processing after a voltage outage and subsequent voltage restoration.

According to FIG. 3, the point s, and thus the system routine 200, is reached after execution of the steps 102–105 and 106–109. Further, the point s is reached after execution of the steps for a test mode 216, a display mode 215 and a franking mode 400.

The explanation of the executions after the franking mode 400 shown in FIG. 5 ensues in combination with the block circuit diagram shown in FIG. 1*a* and the overall executive plan of the electric postage meter machine shown in FIG. 3.

The invention proceeds on the basis that, after activation, the postal value in the value imprint is automatically prescribed corresponding to the last input before the postage meter machine was turned off and the date in the date stamp is prescribed according to the current date, and the variable data for the imprint are electronically embedded into the fixed data for the frame and for all appertaining data that remain unmodified (FIG. 4, step 1040).

Further, the time in the battery supported clock/date module 8 continues to run even with the postage meter machine shut off and is constantly currently stored at least as to the date and is embedded into the initialization routine 101 in step 1040 of FIG. 4.

When, after the postage meter machine is turned on, the step 401 in the franking mode is reached after the implemented system routine 200 and during the operating mode, data that are already stored can be accessed even without an input. This setting is particularly directed to the last setting of the postage meter machine in view of the postage value, which is displayed in step 209, before a renewed input, display and editing of printing data ensue. The current, variable pixel image data (data and postage value) are thereby embedded into the fixed frame pixel image data. Subsequently, an interrogation of the input unit ensues in step 401 for possible, further inputs. If further inputs are present, a loop counter is reset in step 403 and a branch is made back to point t (FIG. 3).

The input data, which are entered with a keyboard as the input unit 2 or via an electronic scale 22 that calculates the postage value and is connected to the input/output module 4, are automatically stored in the memory area D of the non-volatile main memory NVM 5. Data sets of the submemory areas, for example $B_j$, $C_1$ etc., are also non-volatily stored. It is thus assured that the last input quantities are preserved even when the postage meter machine is shut off, so that the postage value in the value imprint corresponding to the last input before the postage meter machine was turned off and the date in the date stamp corresponding to the current date are prescribed automatically after turn-on. In step 209, any entry of new values is interrogated. If, for example, no new postage value was entered, then the previous postage value present stored in the memory area is accessed and a point e (FIG. 3) is reached in order to interrogate further inputs before the franking mode 400 (FIG. 5) is reached.

A branch is again made back over the step 403 to the step 209 given a renewed input request identified in step 401. Otherwise, a branch is made to step 402 in order to increment the loop counter. The step 405 is reached via the step 404, in which the number of loops traversed is checked, in order to wait for the print output request. A letter that is to be franked is detected by a letter sensor. A signal for the print output request is thereby generated.

In step 405, the print output request is awaited in order then to branch via the steps 407, 409 and 4010 to the debiting and printing routine in step 406. If no print output request (step 405) is present a branch is made back to the step 209 (point t)—according to the overall executive plan shown in FIG. 3—and, if no communication request is present, a branch may possibly be made back via steps 211, 212 and 214 to the step 401 of the franking mode 400.

If, as shown in FIG. 5, a branch is then made back to point t and the step 301 is reached after step 209, a communication request can be made at any time by manual input or some other input can be actuated according to the steps of test request 212 and register check 214. The step 401 is reached again. If no input request was recognized, further steps 402 and 404 are executed, as shown in FIG. 5. A further interrogation criterion can be interrogated in a step 405 in order to set a standby flag in step 408 if an input was not actuated and no print output request is present after a number of loops is traversed.

In another version, the standby mode is also reached when, in a way that is known and shown in FIG. 1*a*, no next envelope that is to be franked is identified by the letter sensor 16 within a predetermined time. The step 404—shown in FIG. 4—in the franking mode 400 again either includes an interrogation for time expiration or for the number of passes through the program loop, this ultimately leading again to the input routine according to step 401. If the interrogation criterion is satisfied, a standby flag is set in step 408 and a branch is made directly back to the point p, or alternatively to the point s to the system routine 200 without the debiting and printing routine being traversed in step 406. Given a branch to the point p, an additional change of the code words can be achieved during the standby mode. In a version—not shown in FIG. 5—with a branch under the point s, by contrast, only one change of the code words can be achieved after turn-on.

The standby flag is interrogated during the system routine 200 in step 211 and is may be reset in step 213 after the checksum check as long as attempted manipulation is recognized.

To that end, the interrogation criterion in step 211 is expanded by asking whether the standby flag is set, i.e. whether the standby mode has been reached. In this case, a single branch is made to the step 213. In a preferred version with manipulation monitoring during the standby mode, a code word Y is erased in the way already described when an attempted manipulation in the standby mode was identified in the aforementioned way in step 213. The absence of the code word Y is recognized in step 207 and a branch is then made to step 208. The advantage of this method in conjunction with the first mode is that the attempted manipulation is statistically acquired in step 213.

The standby flag can thus be interrogated in the step 211 following the communication mode 300. Thus a branch is not made to the franking mode 400 before the check of the checksum has yielded the full complement and validity of all or of at least some selected security-relevant programs.

When a print output request is recognized in step 405, further interrogations are actuated in the following steps 409 and 410 as well as in step 406. For example, a check of the register values in step 407 and, additionally, a check of the code word Y can be undertaken in the step 407 and the validity and, additionally, the presence of a kill mode flag set in step 208 (FIG. 3) is determined in step 409 in order to branch to step 410. Otherwise, a branch is made to the step 413 for statistics and/or error evaluation and to step 415 for display of the error if the register values were not authentic.

The reaching of a further piece number criterion is interrogated in step 410. If the piece number predetermined for franking was used up in the preceding franking, i.e. the piece number is now equal to zero, an automatic branch is made to point e in order to then enter into the communication mode 300 so that a new, predetermined piece number s can in turn be credited by the data central. If, however, the predetermined piece number is not yet exhausted, a branch is made from step 410 via steps 4060, 4061, or 4062 and 4063, to the debiting and printing routine in step 406.

In step 4060, a pseudo-random sequence is generated during operation of the postage meter machine before every impression, and thus before every piece number of franking imprints to be newly registered, this being generated on the basis of the preceding piece number, possibly together with the current time supplied by the clock/date module. A pseudo-random generator with corresponding hardware—not shown—or with a program stored in the internal OPT-ROM of the OTP processor is provided for this purpose. At least one of the number of random words that can be possibly generated is stored in the internal OPT-ROM of the OTP processor. After a comparison in step 4061 and a following authenticity check of the MAC in step 4062 within the OTP processor, a redundant storage of the new code word—given coincidence—is undertaken once into the detachable, nonvolatile memories (NVRAMs) and, inventively, also into the aforementioned memory glued non-releasably onto the motherboard ($E^2$PROM 20) or in the internal OTP-NVM, 6*d* or in the external memory 25. The permissible number of write/read cycles for an $E^2$PROM is not exceeded when, for example, the non-volatile memories ($E^2$PROM and NVRAMs) are redundantly written with a new code word, for example, every 24th franking on average. An MAC arises when a code word is utilized for the encoding of accounting data. For storing accounting data with appended MAC into the non-volatile memories 5*a* and 5*b* to be protected at every accounting, a storage of accounting data with an appended MAC exists parallel at irregular intervals in the respective non-volatile memory, preferably an $E^2$PROM 20 or 25, serving as second security means against unauthorized manipulation. Before the next accounting, the accounting data in the non-volatile memories 5*a* and 5*b* to be protected are usually checked in step 406 on the basis of the appended MAC. In the case of a next event arriving in step 4061, however, the accounting dataset is transferred into the OTP 6 in sub-steps—not shown in detail—of the step 4062 in order to check it on the basis of that MAC or that code word which is present stored in the non-volatile memory serving as second security means against unauthorized manipulation. The accounting dataset is encoded with the code word to form a MAC. The MAC formed in this way is compared to the MAC in the non-volatile memories 5*a* and 5*b* to be protected that is appended to the accounting dataset. The comparison can also ensue in cross-wise comparison. Given authentic MACs, a branch is made to step 4063. At least prepare the formation of the new code as well as the storage of debiting data take place in step 4063 before a branch is made to the debiting and printing routine in step 406. Given an identified error or given non-coincidence of the MACs, a branch is made from step 4062 back to step 413 for statistics and error evaluation.

Otherwise, If a non-matching pseudo-random number $Z_{ist}$ is generated during operation of the postage meter machine before every impression, i.e. a pseudo-random number $Z_{ist}$ that yields a non-coincidence in the step 4061 with the at least one random number $Z_{soll}$ stored in the internal OTP-ROM of the OTP processor, then a branch is made to the debiting and printing routine in step 406 without forming a new code word.

If the postal registers together with the contents were removed in unauthorized fashion, such as for the purpose of making copies so that postal matter can be franked without a debiting at the data central or payment at the post office, franking using cloned memory contents is prevented by the invention. An encapsulation of the NVRAM components for the postal registers with a security housing is not required. If a manipulator tries to intervene in the meantime, i.e. from the first through the 23rd franking, with cloned memories (battery-supported CMOS-RAMs), this can be automatically detected by the postage meter machine with a self-test, which had been demanded upon the change to a new code word.

The data contained in the postal registers—i.e., particularly in the battery-supported CMOS-NVRAMs-are also non-volatily stored in the $E^2$PROM 20, 25 or in the internal OTP-NVM 6*d* after a random or pseudo-random sequence of identified piece numbers of frankings.

A manipulator cannot predict when this will occur. An average storage of, for example, 24 frankings thus occurs, so that the service life of the $E^2$PROMs is not shortened compared to the known techniques.

This is accomplished by a code that is checked by the processor (in step 4062, FIG. 5) before every storage in the $E^2$PROM (ensuing approximately after the 24th franking), this being changed for every new storing in the $E^2$PROM (in step 4063, FIG. 5). This check code is stored in a $k^{th}$ register of the NVRAMs and can form a checksum, for example a MAC protection, for the register values at the same time. The checksum or MAC protection for the register values is formed with algorithms and codes that change and are different for the NVRAM and $E^2$PROM, these being stored in an OTP-ROM of an OTP processor. A copying of the $E^2$PROM memory contents onto the NVRAM is thus fruitless because different check codes secure different memories with memory contents that belong together, or relate to one another.

In a simple version, a check code is formed of the register values for every piece number n=l−1 and is compared to the MAC stored in the $E^2$PROM. Given equality, this means there is a piece number n=m at which data were correspondingly stored in the NVRAM and in the $E^2$PROM. The individual register values form a table for a number of n=z frankings, this table including a line for the piece number m at which the check code was stored in the $E^2$PROM. An historic sequence of data thus arises for a limited number z. For a redundant storage of the register values, every individual register value can be stored encoded in the $E^2$PROM. A manipulator cannot restore the affiliation of the data to its line of the table.

The keys and algorithms that are utilized are listed in the OTP-ROM.

A pointer whose data are stored encoded or MAC-protected in the $E^2$PROM references corresponding locations in the list in the OTP-ROM (see FIG. 8). To this end, a counter can be deincremented or incremented for forming the pointer.

Figure 6:
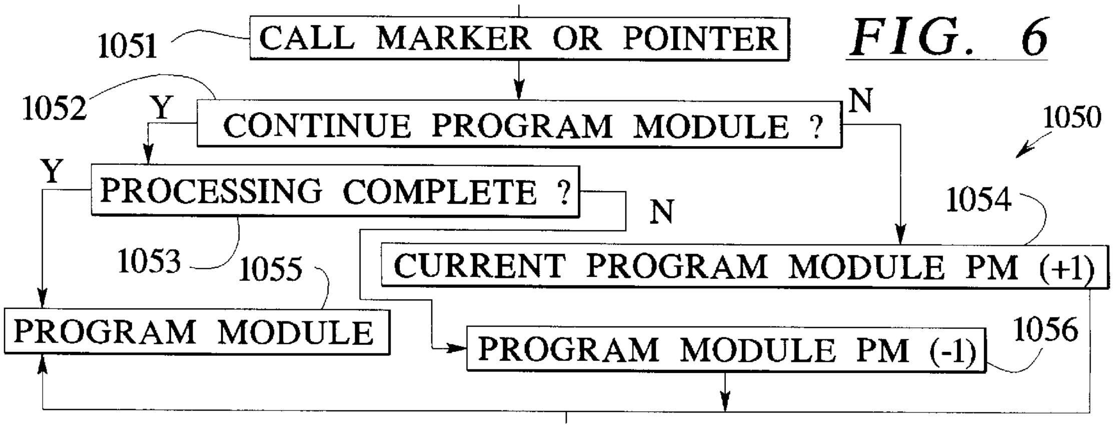
FIG. 6 shows details of the flowchart of FIG. 4.

When a pseudo-random number is reached (in step 4061, FIG. 5) and the check of the MACs of NVRAM and of $E^2$PROM yielded authenticity of the data, a debiting is undertaken in a preferred version and a CRC checksum is formed over all register values at the point in time immediately before a franking or before the step 406 for the standard debiting and printing routine, and is stored in the $E^2$PROM encoded differently from the NVRAM (in step 4063, FIG. 5). When a branch is then made to step 406 (FIG. 5), only the printing routine then need be implemented, as set forth, for example, in European Application 576 113, step 49 in FIG. 6. Otherwise, a branch is made directly from the step 4061 onto the normal debiting and printing routine (in step 406, FIG. 5) and the debiting is carried out in step 406 before a printing ensues.

The inventive solution does not require protection of processors with an internal or external $E^2$PROM by using an undetachable $E^2$PROM fastening on the processor printed circuit board. Before every piece number of franking imprints to be newly registered, a random number is generated on the basis of the preceding piece number and, possibly, also on the basis of the current time supplied by the clock/date module 8. Such electronic counters can also be realized with the battery-supported clock/date module 8. The clock/date module 8 need not be set to a date in the past preceding the current date. The running time is measured and entered into a random algorithm in order to form a number. When a predetermined number is reached, a redundant storage in the $E^2$PROM and NVRAM secured in the aforementioned way is undertaken given the next-following franking.

In another version, a pseudo-random algorithm is generated by hardware with a bit pattern generator. This may be an n-fold shift register with specific feedback that can preferably be a component of an ASIC. The $E^2$PROM and processor can have at lest their security-relevant parts realized in the aforementioned ASIC.

As a result of the pseudo-random algorithm, an average value of approximately 24 frankings occurs in which redundant storing is carried out. An $E^2$PROM (approximately 10,000 cycles) could thus last 24*10,000=240,000 frankings.

A non-volatile memory in the OTP or $E^2$PROM arranged so as to be protected against removal relative to the OTP advantageously forms the basis in order to assure against manipulation protection with respect to cloned memory contents. Storage to protect against manipulation using cloned memory contents (branching to point p, FIG. 3) is thereby undertaken not dependent on specific points in time such as, for example, at turn-on or when switching into the standby mode, but instead is undertaken at random points in time. The point in time of storing can thus no longer be logically derived or predicted by a manipulator/copier but can only be subsequently identified with reference to the piece number.

In step 406, the register data fetched in a known way for debiting are potentially checked in terms of content and are correspondingly altered. For example, the piece counter R4 is incremented given a valid franking with a value>0. The register value R1 is decreased and the register value R2 is correspondingly increased, so that the register value R3 remains constant. After this, a checksum (for example, CRC) is formed over each of the register values and is stored in the NVM 5*a* and/or NVM 5*b* together with the appertaining register values. Securing the individual register data in this manner in order to prevent a manipulation by diminishing R2 (consumed sum) and raising R1 (remaining value) given a constant R3 during ongoing operation, is disclosed in German OS 43 44 476. The MAC (message authentification code) is an encoded checksum that is appended to the register value in the debiting in step 406 (FIG. 4). For example, a DES encoding is suitable. In the franking mode 400 (FIG. 4), the data content can also be additionally checked in the debiting to determine whether the register value sum R3 is equal to the sum of ascending register R1 (remaining value) and descending register R2. Due to the protection with the encoded checksums, however, a check in terms of content can be entirely forgone, particularly since such a check is implemented by the data central during every communication with the postage meter machine. When all columns of a print format have been printed, a branch is made back to the system routine 200.

In addition to the aforementioned formation of new code words on the basis of pseudo-random sequence, the non-volatile memories ($E^2$PROM and NVRAMs) are also redundantly written with a new code word given a different last operating status of the postage meter machine. Such a different last operating status is allocated to predetermined statuses, as was set forth above.

The number of franked letters and the current values in the postal registers are registered in the non-volatile memory 5*a* of the postage meter machine during the debiting routine 406 corresponding to the cost center that was entered, and are available for a later evaluation. A specific sleeping mode counter is initiated to count one counting step farther during the debiting routine ensuing immediately before the printing. The register values can be interrogated as needed in the display mode 215 (FIG. 3). From this, a branch is subsequently made back to the system routine 200.

The TMS370 CO10 from the processor family of Texas Instruments is suitable for the security circuit integrated in the postage meter machine. This has an internal $E^2$PROM of 256 bytes as an NVM.

In one version, the non-volatile, internal processor memories and the non-volatile postal register memory (Bat-NV-CMOS-RAMs) to be protected do not contain the identical code word, but one of the two contains the complementary code word. The processor-internal code word then cannot be interrogated from the outside.

In another version, different code words are allocated to individual memories, whereby the different code words nonetheless have a common sequence from which they were formed and whereby the common sequence is reconstructed by the processor in order to check the validity of the individual code words.

The routine for the code word comparison or for the validity check is interrogated in the processor after the turn-on or given program continuation. If a disparity is found in the comparison, the postage meter machine is blocked for further operations.

The number of the new code words formed is counted beginning with a predetermined point in time and this number is non-volatily stored in the processor. At the point in time of a communication with the data central, the number of code words formed in the past and the currently valid code words are interrogated. Given an unintentional blocking of the postage meter machine due to invalid code words, this enables the subsequent restoration, as needed, of the old condition on the basis of a corresponding data transmission from the data central to the postage meter machine.

A last operating status of the postage meter machine corresponding to the code word includes a status at the completion of manufacture or a status resulting from a reloading of the postage meter machine or a status before the turn-off of the postage meter machine or a status before a voltage outage or before a standby time or before program interruption. Such last operating statuses can likewise occur given the monitoring of further criteria by switching the postage meter machine switches to a corresponding mode. The overall executive plans for the postage meter machine shown in FIG. 3 include steps 202 or 207 for monitoring further criteria. Given an infringement of one of the security criteria, the postage meter machine enters into a corresponding mode and additionally implements the inventive steps 106–109 shown in FIG. 7 in corresponding sub-routines. When the postage meter machine, for example, enters into a sleeping mode if no connection to the data central was made after using a predetermined piece number, and when no manual triggering of a communication is undertaken by the user, an automatic communication with the data central and an implementation of the method for enhancing the security of critical register data against manipulation ensue.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for enhancing security of critical data against manipulation in an information-processing system, comprising the steps of:

(a) storing a list containing a plurality of code words in an internal processor memory of a processor in a system containing critical data to be protected;

(b) loading an identifier into a first non-volatile memory in said system, said identifier identifying one of said code words in said list;

(c) loading said one of code words, as a current code word into a second non-volatile memory of said system, said second non-volatile memory containing the critical data;

(d) conducting a validity check of said current code word at least at a time said system is turned on by comparing said current code word to the code word in said list identified by said identifier;

(e) given validity of said current code word as a result of comparison with the code word in said list identified by said identifier, permitting access to said critical data and replacing said current code word with a predetermined, new code word;

(f) given invalidity of said current code word as a result of comparison with the code word in said list identified by said identifier, blocking said system from further operation after said system is turned on; and (g) after each validity check, modifying said identifier to identify a new one of said code words dependent on a last operating condition of said system and replacing said one of said code words in said second memory with said new one of said code words as sad current code word.

2. A method as claimed in claim 1 comprising the additional step of:

selecting the last operating condition on which the current code word is dependent from the group of last operating conditions consisting of a last operating condition identified by a pseudo-random sequence, a last operating condition set by a manufacturer of said system, a last operating condition resulting from a reloading of said system, a last operating condition before turn-off of said system, a last operating condition before a voltage outage of said system, a last operating condition before said system enters into a standby time, and a last operating condition before program interruption in said system.

3. A method as claimed in claim 2 wherein said last operating condition comprises a last operating condition resulting from reloading of said system, wherein said system communicates with a remote data central and wherein reloading said system comprises the steps of:

placing said system in a communication mode with said remote data central and entering at least a monetary credit and a piece number of items to be processed by said system into respective memories in said system;

counting a number of new code words formed in said system beginning with a predetermined point in time and non-volatilely storing in said system said number of new code words formed externally of said processor;

interrogating, at said data central, said number of new code words formed at said data central; and based on the interrogation, at said data central of said number of new code words formed, un-blocking an improperly blocked system which has become blocked due to a code word being incorrectly identified as invalid and restoring a preceding condition of said system by data transmission from said data central to said system.

4. A method as claimed in claim 1 comprising the additional steps of:

monitoring at least one security criterion related to said last operating condition of said system to determine whether said at least one security criterion is satisfied; and placing said system in a mode for executing steps (a) through (g) only if said at least one security criterion is not satisfied.

5. A method as claimed in claim 1 wherein step (a) comprises storing a first portion of said plurality of code words in a first memory area of said internal processor memory and storing a second portion of said plurality of code words in a second memory area of said internal processor memory, wherein step (b) comprises loading an identifier into a first non-volatile memory in said system, said identifier identifying one code word in said first portion and one code word in said second portion, wherein step (c) comprises allocating first and second code words to a last operating condition of said system and loading said first and second code words, as a first current code word and a second current code word, into said second non-volatile memory of said system, wherein step (d) comprises conducting a validity check of said first and second current code words at least a time said system is turned on by comparing said first current code word to the code word identified by said identifier in said first portion and comparing said second current code word to the code word identified by said identifier in said second portion, wherein step (e) comprises given validity of each of said first and second current code words as a result of comparison with the respective code words in said first and second portions identified by said identifier, permitting access to said critical data and replacing each of said first and second current code words with respective predetermined, first and second new code words, and wherein step (f) comprises given invalidity of either of said first and second current code words as a result of comparison with the respective code words in said first and second portions identified by said identifier, blocking said system from further operation after said system is turned on.

6. A method as claimed in claim 5 wherein step (e) comprises forming said first new code word as a function of a code word in said first portion, and forming said second new code word as a function of a code word in said second portion.

7. A method as claimed in claim 6 comprising the step of selecting said function from the group of functions comprising functions which increment a numerical value, functions which decrement a numerical value and functions which modify a numerical value in a predetermined manner.

8. A method as claimed in claim 1 wherein step (e) comprises forming said new code word as a function of said current code word.

9. A method as claimed in claim 1 wherein step (e) comprises storing said new code word in said second non-volatile memory, and storing a program for calculating said new code word in said internal processor memory and using said program to calculate said new code word.

10. A method as claimed in claim 9 comprising the step of selecting said internal processor memory from the group of memory types comprising read only memories and externally programmable read only memories.

11. A method as claimed in claim 10 wherein said system communicates with a remote data central and comprising the additional steps of:

placing said system in a communication mode with said remote data central and entering at least a monetary credit and a piece number of items to be processed by said system into respective memories in said system;

counting a number of new code words formed in said system beginning with a predetermined point in time and non-volatilely storing in said system said number of new code words formed externally of said processor;

interrogating, at said data central, said number of new code words formed at said data central; and based on the interrogation, at said data central of said number of new code words formed, un-blocking an improperly blocked system which has become blocked due to a code word being incorrectly identified as invalid and restoring a preceding condition of said system by data transmission from said data central to said system.

12. A method as claimed in claim 1 wherein step (b) comprises storing a program for calculating said identifier in said internal processor memory and using said program to calculate said identifier.

13. A method as claimed in claim 12 comprising the step of selecting said internal processor memory from the group of memory types comprising read only memories and externally programmable read only memories.

14. A method as claimed in claim 1 wherein step (b) comprises loading an identifier comprising a pointer into said first non-volatile memory in said system.

15. A method as claimed in claim 1 wherein step (b) comprises loading an identifier comprising a numerical value into said first non-volatile memory in said system.

16. A method for enhancing security of critical data against manipulation in an information-processing system, comprising the steps of:

(a) providing a non-volatile storage medium having a plurality of non-volatile storage areas, said non-volatile storage medium containing said critical data to be protected;

(b) allocating a separate code word respectively to each non-volatile storage area;

(c) providing a further memory selected from the group of memories consisting of an internal memory of a processor for said system, a memory on a chip card, or a similar system memory disposed at a remote data central in communication with said system;

(d) storing at least one of said separate code words in said further memory;

(e) preventing access to said critical data in said storage medium unless a match between at least one separate code word allocated to a non-volatile storage area and said at least one of said separate code words in further memory is made;

(f) forming new code words respectively at predetermined points in time; and (g) storing said new code words in said non-volatile storage medium as replacements for said separate code words.

17. A method as claimed in claim 16 wherein step (f) comprises forming said new code words from previous ones of said separate code words.

18. A method as claimed in claim 17 wherein the step of forming said new code words comprises forming each new code word using an identical code word forming procedure from said separate code words.

19. A method as claimed in claim 17 wherein the step of forming said new code words comprises forming a new code word as a complementary shadow of another new code word to form a complementary code word from said complementary shadow for entry into said storage medium containing said critical data.

20. A method as claimed in claim 17 wherein the step of forming said new code words comprises forming a new code word as a complementary shadow of another new code word to form a complementary code word from said complementary shadow for entry into said storage medium containing said critical data, and storing said complementary shadow in at least one other area of said storage medium.

21. A method for enhancing security of critical data against manipulation in an information-processing system, comprising the steps of:

(a) loading a code word into an internal first non-volatile memory of a processor in said system and loading said code word into a second non-volatile memory of said system, said second non-volatile memory containing said critical data to be protected, said code word corresponding to a last operating condition of said system, said code word constituting a current code word;

(b) executing a validity check of said current code word at least at a time said system is turned on by comparing the respective code words stored in said first and second non-volatile memories;

(c) given agreement of said code words respectively stored in said first and second non-volatile memories, and replacing said current code word in said second non-volatile memory with a new code word selected, dependent on a last operating condition of said system, from a list of code words stored in said first non-volatile memory; and (d) given non-agreement of said respective code word stored in said first and second non-volatile memories, blocking said system from further operation after said system is turned on.

22. A method as claimed in claim 21 comprising the additional step of:

selecting the last operating condition on which the current code word is dependent from the group of last operating conditions consisting of a last operating condition identified by a pseudo-random sequence, a last operating condition set by a manufacturer of said system, a last operating condition resulting from a reloading of said system, a last operating condition before turn-off of said system, a last operating condition before a voltage outage of said system, a last operating condition before said system enters into a standby time, and a last operating condition before program interruption in said system.

23. A method as claimed in claim 22 wherein said system communicates with a remote data central and wherein said last operating condition comprises a last operating condition resulting from reloading of said system, and wherein reloading said system comprises the steps of:

placing said system in a communication mode with said remote data central and entering at least a monetary credit and a piece number of items to be processed by said system into respective memories in said system;

counting a number of new code words formed in said system beginning with a predetermined point in time and non-volatilely storing in said system said number of new code words formed externally of said processor;

interrogating, at said data central, said number of new code words formed at said data central; and based on the interrogation, at said data central of said number of new code words formed, un-blocking an improperly blocked system which has become blocked due to a code word being incorrectly identified as invalid and restoring a preceding condition of said system by data transmission from said data central to said system.

24. A method as claimed in claim 21 comprising the additional steps of:

monitoring at least one security criterion related to said last operating condition of said system to determine whether said at least one security criterion is satisfied; and placing said system in a mode for executing steps (a) through (d) only if said at least one security criterion is not satisfied.

25. A method as claimed in claim 21, comprising loading a code word into the internal first non-volatile memory and into a plurality of second, non-volatile memories containing the data to be protected, checking the current code word for correspondence with the plurality of non-volatile memories before generating code words V and U, forming a new code word W' and subsequently forming a code word T' for the second non-volatile memory according to the equations:

$$W':=F\{P1\} \text{ and}$$

$$T':=F\{P2\},$$

whereby P1 and P2 are different, monotonously steadily variable parameters.

26. A method as claimed in claim 25 wherein said monotonously steadily variable parameters are selected from the group consisting of the current time and the number of program interruptions.

27. A method as claimed in claim 25 comprising incrementing a numerical value before loading said new code word and the new code word is then calculated.

28. A method as claimed in claim 21, comprising forming the new code word dependent on the current code word.

29. A method as claimed in claim 21 further comprising storing said new code word in said second non-volatile memory, and storing a program for calculating said new code word in said internal processor memory and using said program to calculate said new code word.

30. A method as claimed in claim 29 comprising the step of selecting said internal processor memory from the group of memory types comprising read only memories and externally programmable read only memories.

31. A method for enhancing security of critical data against manipulation in an information-processing system, comprising the steps of:

providing a storage medium in said system having a plurality of non-volatile storage areas;

allocating a separate code word respectively to each storage area; storing each of said separate code words in a non-volatile memory of a processor in said system;

checking for and requiring equivalency between at least one code word stored in said storage medium and at least one code word stored in said processor before permitting access to said critical data; and after each check for equivalency, changing said at least one code word stored in said storage medium and said at least one code word stored in said processor for which equivalency is required before permitting access to said critical data.

32. A method as claimed in claim 31 wherein said system communicates with a remote data central and comprising the additional steps of:

placing said system in a communication mode with remote data central and entering at least a monetary credit and a piece number of items to be processed by said system into respective memories in said system;

counting a number of new code words formed in said system beginning with a predetermined point in time and non-volatilely storing in said system said number of new code words formed externally of said processor;

interrogating, at said data central, said number of new code words formed at said data central; and based on the interrogation, at said data central of said number of new code words formed, un-blocking an improperly blocked system which has become blocked due to a code word being incorrectly identified as invalid and restoring a preceding condition of said system by data transmission from said data central to said system.

33. A method as claimed in claim 31 wherein the step of changing said at least one code word comprises forming a new code word using an identical code word procedure from said separate code words.

34. A method as claimed in claim 31 wherein the step of changing said at least one code word comprises forming a new code word as a complementary shadow of another code word to form a complementary code word from said complementary shadow for entry into said storage medium containing said critical data.

35. A method as claimed in claim 31 wherein the step of changing said at least one code word comprises forming a new code word as a complementary shadow of another code word to form a complementary code word from said complementary shadow for entry into said storage medium containing said critical data, and storing said complementary shadow in at least one other area of said storage medium.

36. An apparatus for enhancing security of critical data against manipulation in an information-processing system, comprising:

an internal processor having a non-volatile processor memory;

a further non-volatile memory, separate from said processor memory, respective code words being loaded into each of said processor memory and said further non-volatile memory;

security means for checking for, and for permitting access to said critical data only upon, coincidence of the code words respectively stored in the processor memory and the further non-volatile memory;

means for changing said code words respectively stored in the processor memory and in the further non-volatile memory after each check for coincidence by said security means; and a sealed, secured housing containing said internal processor and said further non-volatile memory.

37. An apparatus as claimed in claim 36 wherein said non-volatile processor memory comprises a non-volatile memory internally contained in said internal processor.

38. An apparatus as claimed in claim 36 wherein said non-volatile processor memory comprises a non-volatile memory separate from said internal processor and connected for data exchange with said internal processor.

39. An apparatus as claimed in claim 38 further comprising an input/output control module contained in said housing and connected to said internal processor and to said non-volatile processor memory for transmitting data therebetween, and wherein said non-volatile processor memory is disposed in said housing and said apparatus further comprising means for mounting said non-volatile processor memory in said housing for preventing removal thereof during operation of said apparatus.

40. An apparatus as claimed in claim 38 wherein said non-volatile processor memory comprises a memory carried on a chip card, and said apparatus further comprising a chip card write/read unit connected to said internal processor for transmitting data between said memory of said chip card and said internal processor.

41. An apparatus as claimed in claim 36 wherein said further non-volatile processor memory comprises an internal EPROM.

42. A method for enhancing security against manipulation of critical data in a machine, comprising the steps of:

loading an authentification code that is generated with a code word, that is allocated to the code word and that encodes accounting data, into a first non-volatile memory that is protected against removal and manipulation during the running time of the machine;

loading the accounting data and said authentification code into second non-volatile memories NVM to be protected that contain register data, and allocating the code word to a last operating condition of the machine;

conducting a validity check of the authentification code that is allocated to the code word, at least the time the machine is turned on and, subsequently, upon an occurrence of a predetermined event;

replacing the code word with a predetermined, new code word for forming a further authentification code that is allocated to the new code word and that encodes accounting data upon a determination of validity of the code word; and blocking the machine after it is turned on if, following the validity check, the authentification code checked on the basis of the code word is invalid.

43. A method as claimed in claim 42 further comprising loading said authentification code after the machine is turned on at predetermined chronological intervals.

44. A method as claimed in claim 42 further comprising loading said authentification code at intervals based on an item count of items processed by said machine.

45. A method as claimed in claim 42 further comprising loading said authentification code at intervals determined by a pseudo-random sequence.

46. A method for enhancing security against manipulation of critical data in a register in a machine comprising the steps of:

providing a first internal memory in said machine and securing said first internal memory against removal and manipulation during operation of said machine;

placing said first internal memory in communication with a processor in said machine during the operation of said machine generating a plurality of authentification codes using respectively separate code words and storing said plurality of authentification codes respectively in a plurality of non-volatile memory areas;

storing at least one of said plurality of authentification codes and said separate code words non-volatily in said first internal memory; and generating a plurality of new code words, respectively replacing said separate code words, upon an occurrence of a predetermined event and storing a plurality of respective authentification codes generated with said new code words in said plurality of non-volatile memories and in a register to be protected.

* * * * *